(12) United States Patent
Stearns et al.

(10) Patent No.: US 8,770,691 B2
(45) Date of Patent: Jul. 8, 2014

(54) ACOUSTICALLY EJECTING A DROPLET OF FLUID FROM A RESERVOIR BY AN ACOUSTIC FLUID EJECTION APPARATUS

(75) Inventors: Richard Stearns, Soquel, CA (US); Shehrzad Ahmed Qureshi, Palo Alto, CA (US)

(73) Assignee: Labcyte Inc., Sunnyvale, CA (US)

(*) Notice: Subject to any disclaimer, the term of this patent is extended or adjusted under 35 U.S.C. 154(b) by 656 days.

(21) Appl. No.: 12/721,389

(22) Filed: Mar. 10, 2010

(65) Prior Publication Data
US 2010/0171779 A1 Jul. 8, 2010

Related U.S. Application Data

(62) Division of application No. 10/956,616, filed on Oct. 1, 2004, now Pat. No. 7,717,544.

(51) Int. Cl.
*B41J 29/38* (2006.01)
*B41J 2/135* (2006.01)

(52) U.S. Cl.
USPC ............................................. 347/10; 347/46

(58) Field of Classification Search
USPC ........................................................ 347/45, 46
See application file for complete search history.

(56) References Cited

U.S. PATENT DOCUMENTS

| 6,298,726 B1* | 10/2001 | Adachi et al. ................... 73/632 |
| 2002/0064809 A1* | 5/2002 | Mutz et al. ................... 435/40.5 |
| 2003/0150257 A1* | 8/2003 | Mutz et al. ................... 73/61.49 |
| 2005/0092058 A1* | 5/2005 | Ellson et al. ................... 73/1.82 |

* cited by examiner

*Primary Examiner* — Lisa M Solomon
(74) *Attorney, Agent, or Firm* — Jones Day

(57) ABSTRACT

The invention provides apparatuses and methods for acoustically ejecting the fluid from a reservoir contained in or disposed on a substrate. The reservoir has a portion adapted to contain a fluid, and an acoustic radiation generator is positioned in acoustic coupling relationship to the reservoir. Acoustic radiation generated by the acoustic radiation generator is transmitted through at least the portion of the reservoir to an analyzer. The analyzer is capable of determining the energy level of the transmitted acoustic radiation and raising the energy level of subsequent pulses to a level sufficient to eject fluid droplets from the reservoir. The invention is particularly suited for delivering fluid from a plurality of reservoirs in an accurate and efficient manner.

49 Claims, 9 Drawing Sheets

Echo images for 70% and 90% DMSO, for toneburst excitation 1 dB below threshold.

Echo images for 70% and 90% DMSO, for toneburst excitation at ejection threshold.

ional of U.S. patent application
ACOUSTICALLY EJECTING A DROPLET OF FLUID FROM A RESERVOIR BY AN ACOUSTIC FLUID EJECTION APPARATUS

CROSS-REFERENCE TO RELATED APPLICATIONS

This application is a divisional of U.S. patent application Ser. No. 10/956,616, filed Oct. 1, 2004, which is incorporated by reference in its entirety.

TECHNICAL FIELD

The invention relates generally to the use of acoustic energy for acoustically ejecting fluid disposed in a reservoir contained in or disposed on a substrate. In particular, the invention relates to methods and apparatuses used in the analysis and adjustment of acoustic energy levels to a level sufficient to provide a droplet-forming pulse. Uniform energy levels in droplet formation and ejection are more likely to produce greater uniformity in drop volume and more effective control on power output of the ejector. With known power levels for droplet ejection, it is possible to develop a "signature" for one well or for a plurality of wells disposed in or contained on a well plate. With a plate of known "signature" it is possible to calibrate the ejector itself to determine its power settings. The invention is particularly suited for use in conjunction with combinatorial synthetic and analytical systems that employ biomolecular libraries containing a large number of different fluid reservoirs.

BACKGROUND

The discovery of novel and useful materials depends largely on the capacity to make and characterize new compositions of matter. As a result, recent research relating to novel materials having useful biological, chemical, and/or physical properties has focused on the development and implementation of new methods and systems for synthesizing and evaluating potentially useful chemical compounds. In particular, high-speed combinatorial methods have been developed to address the general need in the art for systematic, efficient, and economical material synthesis techniques as well as methods to analyze and to screen novel materials for useful properties.

High-speed combinatorial methods often involve the use of array technologies that require accurate dispensing of fluids each having a precisely known chemical composition, concentration, stoichiometry, ratio of reagents, and/or volume. Such array technologies may be employed to carry out various synthetic processes and evaluations. Array technologies may employ large numbers of different fluids to form a plurality of reservoirs that, when arranged appropriately, create combinatorial libraries. In order to carry out combinatorial techniques, a number of fluid dispensing techniques have been explored, such as pin spotting, pipetting, inkjet printing, and acoustic ejection.

Many of these techniques possess inherent drawbacks that must be addressed, however, before the fluid dispensing accuracy and efficiency required for the combinatorial methods can be achieved. For instance, a number of fluid dispensing systems are constructed using networks of tubing or other fluid-transporting vessels. Tubing, in particular, can entrap air bubbles, and nozzles may become clogged by lodged particulates. As a result, system failure may occur and cause spurious results. Furthermore, cross-contamination between the reservoirs of compound libraries may occur due to inadequate flushing of tubing and pipette tips between fluid transfer events. Cross-contamination can easily lead to inaccurate and misleading results.

Acoustic ejection provides a number of advantages over other fluid dispensing technologies. In contrast to inkjet devices, nozzleless fluid ejection devices are not subject to clogging and their associated disadvantages, e.g., misdirected fluid or improperly sized droplets. Furthermore, acoustic technology does not require the use of tubing or involve invasive mechanical actions, for example, those associated with the introduction of a pipette tip into a reservoir of fluid.

Acoustic ejection has been described in a number of patents. For example, U.S. Pat. No. 4,308,547 to Lovelady et al. describes a liquid drop emitter that utilizes acoustic principles to eject droplets from a body of liquid onto a moving document to result in the formation of characters or barcodes thereon. A nozzleless inkjet printing apparatus is used such that controlled drops of ink are propelled by an acoustical force produced by a curved transducer at or below the surface of the ink. Similarly, U.S. Ser. No. 09/964,212 describes a device for acoustically ejecting a plurality of fluid droplets toward discrete sites on a substrate surface for deposition thereon. The device includes an acoustic radiation generator that may be used to eject fluid droplets from a reservoir, as well as to produce a detection acoustic wave that is transmitted to the fluid surface of the reservoir to become a reflected acoustic wave. Characteristics of the reflected acoustic radiation may then be analyzed in order to assess the acoustic energy level produced by the acoustic radiation generator at the fluid surface. Thus, acoustic ejection may provide an added advantage in that the proper use of acoustic radiation provides feedback relating to the process of acoustic ejection itself.

The ability to predetermine the threshold level of droplet production for a fluid disposed in a reservoir would enable the user to more accurately control droplet size, minimize fluid waste and provide substantially more effective control of the power output of the acoustic energy generating apparatus used in fluid output from the reservoirs. Because the materials having biological, chemical, and/or physical properties useful in combinatorial synthesis can be extremely rare and/or prohibitively expensive, it is desirable to provide effective controls on power output, and consequently drop volume, in their use.

Regardless of the dispensing technique used, however, inventory and materials handling limitations generally dictate the capacity of combinatorial methods to synthesize and analyze increasing numbers of sample materials. For instance, during the formatting and dispensing processes, microplates that contain a plurality of fluids in individual wells may be thawed, and the fluid in selected wells can then be extracted for use in a combinatorial method. When a pipetting system is employed during extraction, a minimum loading volume may be required for the system to function properly. Similarly, other fluid dispensing systems may also require a certain minimum reservoir volume to function properly. Thus, for any fluid dispensing system, it is important to audit or monitor the reservoir contents to ensure that at least a minimum amount of fluid is provided. Such content monitoring generally serves to indicate the overall performance of a fluid dispensing system, as well as to maintain the integrity of the combinatorial methods.

An additional feature desirable in fluid monitoring is the ability to evaluate the properties of the microplate itself. Structural anisotropies at the molecular level, such as variations in the molecular orientation in the polymers used to make the plate, can impact the transmission of acoustic energy through the plate. Variations in molecular orientation lead to variations in the reflected acoustic energy from both the plate interface with the reservoir fluid as well as the reservoir fluid interface with the atmosphere. Such variations need to be accounted for or they will be attributed erroneously to variations in composition measurements, fluid height detection and the amount of energy reaching the surface.

In addition, during combinatorial synthesis or analysis processes, environmental effects may play a role in altering the reservoir contents. For example, dimethylsulfoxide (DMSO) is a common organic solvent employed to dissolve or suspend compounds commonly found in drug libraries. DMSO is highly hygroscopic and tends to absorb any ambient water with which it comes into contact. In turn, the absorption of water dilutes the concentration the compounds as well as alters the ability of the DMSO to suspend the compounds. Furthermore, the absorption of water may impact the transmission properties of acoustic energy transmitted through a DMSO/water mixture and other water-sensitive compounds.

U.S. Pat. No. 5,880,364 to Dam, on the other hand, describes a non-contact ultrasonic system for measuring the volume of liquid in a plurality of containers. An ultrasonic sensor is disposed opposite the top of the containers. A narrow beam of ultrasonic radiation is transmitted from the sensor to the open top of an opposing container to be reflected from the air-liquid interface of the container back to the sensor. By using the round trip transit time of the radiation and the dimensions of the containers being measured, the volume of liquid in the container can be calculated. This device cannot be used to analyze wave forms of acoustic energy in fluid in sealed containers. In addition, the device lacks precision because air is a poor conductor of acoustic energy. Thus, while this device may provide rough estimate of the volume of liquid in relatively large containers, it is unsuitable for use in providing a detailed analysis of the wave forms of acoustic energy in fluids in reservoirs typically used in combinatorial techniques. In particular, this device cannot determine the position of the bottom of containers since substantially all of the emitted acoustic energy is reflected from the liquid surface and does not penetrate to detect the bottom. Small volume reservoirs such as microplates are regular arrays of fluid containers, and the location of the bottoms of the containers can vary by a significant fraction of the nominal height of a container due to distortions in the plate, such as bowing. Thus, detection of only the position of the liquid surface leads to significant errors in height and thus volume estimation in common containers.

Thus, there is a need in the art for improved methods and apparatuses that are capable of efficiently delivering fluid to a plurality of reservoirs, a capability that is particularly useful in synthetic and analytical processes to increase the robustness, efficiency, and effectiveness of the combinatorial techniques employed therein.

There is a need in the art to determine the energy level of an acoustic pulse to a site at the surface of a fluid in a reservoir and the ability to process the reflected energy of that pulse to be able to raise the amplitude of succeeding pulses to an energy level sufficient to form a droplet, i.e., threshold level. There is a need to analyze the input energy level of a pulse having an energy level sufficient to disturb or perturb the surface of the fluid in the reservoir but lower than threshold level, i.e., a sub-threshold pulse, in order to be able to generate a subsequent pulse having a sufficient acoustic energy level to form a droplet. There is a need in the art for a method to map non-uniformities in the wells contained in a well plate. There is a need in the art to be able to effectively calibrate the power system used to generate acoustic energy.

SUMMARY OF THE INVENTION

In a first embodiment, the invention provides an improved method for acoustically ejecting a droplet of fluid from a fluid reservoir contained in or located on a substrate. The reservoir containing a fluid is acoustically coupled to an acoustic ejector that produces acoustic radiation. The ejector is activated to generate pulses of acoustic radiation through the substrate, to a site at or near the surface of the fluid in the reservoir, in a manner effective to eject a droplet from the reservoir. In the improved method, prior to acoustically ejecting a droplet of fluid, the wave form of a sub-threshold or perturbation pulse of acoustic radiation to be generated at said site is determined and the amplitude of the perturbation pulse of acoustic radiation generated at the site is adjusted to an acoustic energy output level sufficient to eject a fluid droplet.

In the method of the first embodiment, the amplitude of the drop forming pulse at a site is determined by acoustically coupling the acoustic ejector with the reservoir, activating the acoustic ejector to generate and direct a perturbation pulse at the site such that no fluid droplet will be ejected, and then generating a perturbation interrogation pulse to the fluid surface of the site. The perturbation interrogation pulse is reflected from the fluid surface. The analyzer then detects and processes the reflected perturbation interrogation pulse.

The processing of the reflected perturbation interrogation pulse may include analysis of the time domain waveform of the pulse of its frequency spectrum. Analysis of the frequency spectrum includes using a frequency domain-based algorithm to identify the difference in frequency spacing between two minima of an "echo" portion of the reflected perturbation interrogation pulse. The spacing between two minima is then used by the analyzer to increase the acoustic energy level of the perturbation pulse by the acoustic ejector to a level sufficient to eject a fluid droplet. In a preferred embodiment of the improved method, the frequency domain-based adaptive algorithm utilizes a Fast Fourier Transform (FFT) to characterize the frequency content of the perturbation interrogation pulse response and extract the minima.

In another embodiment, the invention relates to an apparatus for acoustically ejecting a droplet of fluid from a reservoir wherein the reservoir is contained in or disposed on a substrate and a quantity of fluid is disposed in the reservoir. The apparatus includes an acoustic radiation generator for generating a pulse of acoustic radiation and a means for acoustically coupling the acoustic radiation generator with the reservoir.

The acoustic radiation generator can generate a pulse of acoustic radiation which is then transmitted through the substrate to a site at or near the surface of the fluid in the reservoir. Such pulse is intended to eject a droplet from the reservoir acoustically coupled to the acoustic radiation generator.

The apparatus includes an analyzer for determining, prior to acoustically ejecting a droplet of fluid from a reservoir, the energy level of a perturbation pulse of acoustic radiation to be generated at said site. The analyzer then adjusts the amplitude of the perturbation pulse to an acoustic energy output level sufficient to eject a fluid droplet.

A further embodiment relates to an apparatus for acoustically ejecting a droplet of fluid from each of a plurality of reservoirs wherein such apparatus includes a plurality of fluid reservoirs contained in or located on one or more substrates and a quantity of fluid disposed in each of the reservoirs.

In the apparatus of this further embodiment the acoustic radiation generator is successively acoustically coupled with each reservoir such that a pulse of acoustic radiation generated by the acoustic radiation generator is transmitted through the substrate and into the fluid to a site at or near the surface of the fluid in each reservoir in a manner intended to eject a droplet from each reservoir.

Prior to acoustically ejecting a droplet of fluid from a reservoir the analyzer for this embodiment then determines, successively, for each of the reservoirs contained in or disposed on the substrate, the wave form of a perturbation pulse of acoustic radiation to be generated at each site. The determination of each perturbation pulse wave form is based typically on the wave form for a drop forming pulse for desired droplet volume for the fluid composition in each reservoir. The analyzer then follows the perturbation pulse with one or more perturbation interrogation pulses to adjust the amplitude of succeeding pulses in each reservoir to an acoustic energy output level sufficient to eject fluid droplets.

In the apparatus of this further embodiment, the analyzer determines the amplitude necessary for a drop forming pulse at each site by acoustically coupling the acoustic ejector successively with each reservoir, then activating the acoustic ejector to generate and direct a perturbation pulse at a site in each reservoir. The perturbation pulse is sufficient to disturb the surface of the fluid at the site, but is not at an acoustic energy level sufficient to allow a fluid droplet to be ejected from the site. Following the perturbation pulse, the analyzer causes the ejector to generate a perturbation interrogation pulse to the fluid surface of each site. Typically the perturbation interrogation pulse is reflected from the fluid surface. The analyzer then detects and processes the reflected perturbation interrogation pulse.

The processing of the reflected perturbation interrogation pulse by the analyzer includes analyzing echo data provided within such pulse. Analysis of the echo data may include either time-domain or frequency-domain analysis such as identification of the difference in frequency spacing between two minima of the processed echo data.

In one specific embodiment, the analyzer then uses the spacing between two minima to determine the acoustic energy level necessary for the acoustic ejector to produce a droplet forming pulse. In a preferred embodiment of the apparatus, the frequency domain-based adaptive algorithm used by the analyzer to process the echo data is an FFT-based algorithm.

A further embodiment of the present invention provides a method for acoustically auditing a plurality of fluid reservoirs contained in or located on a substrate. An acoustic ejector that produces acoustic radiation is acoustically coupled to a first reservoir at a first site containing a fluid.

The ejector is then activated to generate a perturbation pulse of acoustic radiation through the substrate and into the fluid sufficient to disturb the surface of the fluid at the site but below the acoustic energy level effective to eject a droplet from the site. The fluid volume in the reservoir is adjusted to conform to a predetermined perturbation level at the site; optionally, the ejector can be activated to generate a pulse of acoustic radiation through the substrate and into the fluid in a manner effective to eject a droplet from the first reservoir. The method set forth above is then repeated with each of the plurality of fluid reservoirs on the substrate in succession. The volume adjustments obtained at each site are used to catalogue site to site variations on the substrate. Optionally, data associated with the type of substrate/reservoirs used—for example, a given type of microplate—can be stored and used when the same plate type is encountered again to facilitate the droplet forming process. The present invention also provides a method for acoustically auditing a plurality of fluid reservoirs contained in or located on a substrate by providing a determinable volume fluid having a known composition in each reservoir and adjusting the fluid volume in each reservoir to conform the site to a predetermined ejection threshold level, acoustically coupling a first reservoir at a first site containing a fluid to an acoustic ejector that produces acoustic radiation, then activating the ejector to generate a sub threshold pulse of acoustic radiation through the substrate and into the fluid to the site below the level effective to eject a droplet from the first reservoir, and analyzing the sub threshold pulse to determine the gap to the ejection threshold. The ejection threshold is then compared with the predetermined ejection threshold. The procedure is then repeated with each of the plurality of fluid reservoirs in succession, then, the difference between ejection threshold and a predetermined ejection threshold at each site is used to catalogue site to site variations on the substrate.

In another method for acoustically ejecting a droplet of fluid in one or more fluid reservoirs, the analyzer is operated to analyze a characteristic of the transmitted radiation in order to assess the fluid in a selected reservoir. Optionally, the acoustic radiation generator could be coupled acoustically successively to each of the remaining reservoirs to permit assessment of the fluid therein.

To determine the volume of fluid in a selected reservoir, we must first determine its composition based on impedance information based on the ratio of the reflected energy amplitude from the fluid/reservoir interface and the reflected energy amplitude from the fluid surface. This measurement provides the speed of sound. Then the time delay between reflected signals from the upper and lower interfaces of the liquid is used to provide the travel time within the fluid. Time (t) multiplied by the speed-of-sound ($v_s$), with the result divided by 2, i.e., ($t*v_s/2$), provides the depth of the fluid in the well. Volume can then be estimated for a known cavity shape for a well. Factors influencing such volume calculation include the ability to estimate how much fluid is in the meniscus. The results of the acoustic analysis may be stored electronically for later use.

One object of the present invention is to determine the right amount of energy for ejection in the droplet-forming application. However the droplet forming application can also be used for calibration purposes. In a first calibration method using the droplet forming application, reflected energy can be used to calibrate the energy generation and delivery system. In a second calibration method using the droplet-forming application, the impact of the energy transmitted through the plate can be determined in order to correct for variations (well-to-well) in the micro plate as well as in other microplates believed to be similar in behavior because they were produced in a similar fashion (using the same mold, the same molded materials and the same molding parameters).

Typically, the inventive apparatus includes a single acoustic radiation generator and a plurality of removable reservoirs. In addition, the acoustic radiation generator may comprise a component common to the analyzer, such as a piezoelectric element. Optionally, the acoustic generator may represent a component of an acoustic ejector, which ejects droplets from the reservoirs. In such a case, the apparatus may further comprise a means to focus the acoustic radiation.

BRIEF DESCRIPTION OF THE DRAWINGS

FIG. 1A shows the acoustic ejector acoustically coupled to the first reservoir; the ejector is activated in order to eject a droplet of fluid from within the first reservoir toward a site on a substrate surface to form an array. FIG. 1B shows the acoustic ejector acoustically coupled to a second reservoir.

FIG. 3A illustrates a well plate in top view. FIG. 3B illustrates the well plate in cross-sectional view along dotted line A. FIG. 3C illustrates the well plate in bottom view.

FIG. 4A shows right-hand and left-hand images of DMSO/water mixtures having DMSO concentrations of 70% and 90%, respectively, for tone burst excitation 1 dB below threshold. FIG. 4B shows right-hand and left-hand images of DMSO/water mixtures having DMSO concentrations of 70% and 90%, respectively, for tone burst excitation 0.5 dB below threshold. FIG. 4C shows right-hand and left-hand images of DMSO/water mixtures having DMSO concentrations of 70% and 90%, respectively, for tone burst excitation at ejection threshold.

FIG. 7A shows a perturbation interrogation pulse response waveform. FIG. 7B shows a perturbation interrogation pulse "echo" waveform. FIG. 7C shows a Fast Fourier Transform (FFT) obtained from the processing of the perturbation interrogation pulse "echo" waveform of FIG. 7B.

DETAILED DESCRIPTION OF THE INVENTION

Figure 1A:
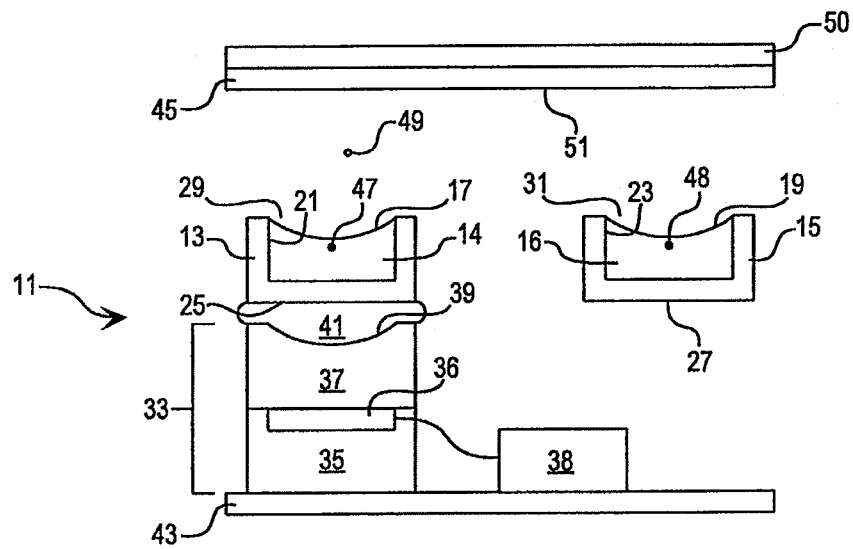
FIGS. 1A and 1B, collectively referred to as FIG. 1, schematically illustrate in simplified cross-sectional view a preferred embodiment of the inventive apparatus that allows both the ejection of fluid droplets from a plurality of reservoirs and the adjustment of the amplitude of the pulse of acoustic radiation generated at each individual site to an acoustic energy output level sufficient to eject a fluid droplet. As depicted, the apparatus comprises first and second reservoirs, a combined acoustic analyzer and ejector, and an ejector positioning means.

Before describing the present invention in detail, it is to be understood that this invention is not limited to specific fluids, biomolecules, or apparatus structures, as such may vary. It is also to be understood that the terminology used herein is for the purpose of describing particular embodiments only, and is not intended to be limiting.

It must be noted that, as used in this specification and the appended claims, the singular forms "a," "an," and "the" include plural referents unless the context clearly dictates otherwise. Thus, for example, reference to "a reservoir" includes a plurality of reservoirs, reference to "a fluid" includes a plurality of fluids, reference to "a biomolecule" includes a combination of biomolecules, and the like.

In describing and claiming the present invention, the following terminology will be used in accordance with the definitions set forth below.

The terms "acoustic coupling" and "acoustically coupled" as used herein refer to a state wherein an object is placed in direct or indirect contact with another object so as to allow acoustic radiation to be transferred between the objects without substantial loss of acoustic energy. When two entities are indirectly acoustically coupled, an "acoustic coupling medium" is needed to provide an intermediary through which acoustic radiation may be transmitted. Thus, an ejector may be acoustically coupled to a fluid, such as by immersing the ejector in the fluid, or by interposing an acoustic coupling medium between the ejector and the fluid, in order to transfer acoustic radiation generated by the ejector through the acoustic coupling medium and into the fluid. The generator and the fluid can be brought into an acoustic coupling relationship through either the motion of the generator, the reservoir containing the fluid or both.

The term "fluid" as used herein refers to matter that is nonsolid, or at least partially gaseous and/or liquid, but not entirely gaseous. A fluid may contain a solid that is minimally, partially, or fully solvated, dispersed, or suspended. Examples of fluids include, without limitation, aqueous liquids (including water per se and salt water) and nonaqueous liquids such as organic solvents and the like. As used herein, the term "fluid" is not synonymous with the term "ink" in that an ink must contain a colorant and may not be gaseous.

The terms "focusing means" and "acoustic focusing means" refer to a means for causing acoustic waves to converge at a focal point, either by a device separate from the acoustic energy source that acts like an optical lens, or by the spatial arrangement of acoustic energy sources to effect convergence of acoustic energy at a focal point by constructive and destructive interference. A focusing means may be as simple as a solid member having a curved surface, or it may include complex structures such as those found in Fresnel lenses, which employ diffraction in order to direct acoustic radiation. Suitable focusing means also include phased array methods as are known in the art and described, for example, in U.S. Pat. No. 5,798,779 to Nakayasu et al. and Amemiya et al. (1997) *Proceedings of the 1997 IS&T NIP13 International Conference on Digital Printing Technologies*, pp. 698-702.

The terms "library" and "combinatorial library" are used interchangeably herein to refer to a plurality of chemical or biological moieties arranged in a pattern or an array such that the moieties are individually addressable. In some instances, the plurality of chemical or biological moieties is present on the surface of a substrate, and in other instances, the plurality of moieties represents the fluid in a plurality of reservoirs. Preferably, but not necessarily, each moiety is different from each of the other moieties. The moieties may be, for example, peptidic molecules and/or oligonucleotides.

The term "low frequency preamble" refers to a precursor segment of the perturbation interrogation pulse echo in the time domain. If present, it is desirable to eliminate the low frequency preamble from the frequency content analysis of the perturbation interrogation pulse echo. This can be accomplished by including only the portion of the perturbation interrogation pulse echo which matches the frequency content of the perturbation interrogation pulse. The FFT of the time domain signal of the perturbation interrogation pulse echo with the low frequency preamble removed is then used for determination of the spacing between two minima. The low frequency preamble deletion from the time series input to the FFT improves robustness of the signal processing by preventing a shift in the location of the lowest frequency minimum.

The term "moiety" refers to any particular composition of matter, e.g., a molecular fragment, an intact molecule (including a monomeric molecule, an oligomeric molecule, and a polymer), or a mixture of materials (for example, an alloy or a laminate).

"Optional" or "optionally" means that the subsequently described circumstance may or may not occur, so that the description includes instances where the circumstance occurs and instances where it does not.

The term "perturbation pulse" refers to the acoustic energy delivered to a site in the fluid to create a response in the surface. Typically, this energy has a similar duration and a similar frequency spectrum as the drop forming pulse, but this pulse has lower amplitude than the droplet forming pulse. In other words, this pulse is designed to deliver what is substantially a lower amplitude (scaled-down) version of the droplet forming pulse to the site in order to evoke the same energy transmission characteristics as the droplet forming pulse. Acoustic transduction by the acoustic generator and acoustic energy transmission from the acoustic generator to the site is not uniform for all frequencies, and hence, it is desirable to have the same frequency content for the perturbation pulse as is in the droplet forming pulse. Also, the time at which energy of a given frequency arrives at the site will influence the dynamics of the perturbation. Hence, it is desirable for the relative time of the arrival of energy of various frequencies to be similar in the perturbation and droplet forming pulses. The term "pulse" and the term "tone burst" both refer to waveforms, with the only difference often being the number of cycles in the waveform, and may be used interchangeably throughout the subject patent application.

The term "perturbation interrogation pulse" refers to the acoustic energy delivered to the site in the fluid to determine the response of the fluid to the perturbation pulse. The pulse is generated at a time interval following the perturbation pulse that enables the surface to respond to the perturbation pulse. The energy reflected from the perturbed surface is referred to herein as the perturbation interrogation pulse response.

The term "perturbation interrogation pulse echo" refers to that portion of the perturbation interrogation pulse response that is used by the analyzer to determine the spacing between two minima used to adjust the amplitude of a perturbation pulse to a droplet forming level. The perturbation interrogation pulse echo is relatively short in duration (about 1 MHz) and occurs about 550 to 575 MHz after the beginning of the perturbation interrogation pulse response.

The term "ranging interrogation pulse" refers to the acoustic pulse used to find the depth of the liquid in a well in order to adjust the transducer position such that the site is located near the fluid surface for drop generation.

The term "reservoir" as used herein refers to a receptacle or chamber for containing a fluid. In some instances, a fluid contained in a reservoir necessarily will have a free surface, e.g., a surface that allows acoustic radiation to be reflected there from or a surface from which a droplet may be acoustically ejected. A reservoir may also be a locus on a substrate surface within which a fluid is constrained.

The term "site" or "energy site" refers to the location in the fluid that will receive acoustic energy. This can be for different purposes such as for perturbing the surface, interrogating the perturbation of the surface or forming a drop. The site is preferably at or near the surface of a fluid in a reservoir.

The term "substrate" as used herein refers to any material having a surface which provides means for containing one or more fluid volumes. The substrate may be constructed in any of a number of forms including, for example, wafers, slides, well plates, or membranes. In addition, the substrate may be porous or nonporous as required for containment of a particular fluid volume. The means for containing fluid volumes are often reservoirs or wells. Suitable substrate materials include, but are not limited to, supports that are typically used for solid phase chemical synthesis, such as polymeric materials (e.g., polystyrene, polyvinyl acetate, polyvinyl chloride, polyvinyl pyrrolidone, polyacrylonitrile, polyacrylamide, polymethyl methacrylate, polytetrafluoroethylene, polyethylene, polypropylene, polyvinylidene fluoride, polycarbonate, and divinylbenzene styrene-based polymers), agarose (e.g., Sepharose®), dextran (e.g., Sephadex®), cellulosic polymers and other polysaccharides, silica and silica-based materials, glass (particularly controlled pore glass, or "CPG") and functionalized glasses, ceramics, such substrates treated with surface coatings, e.g., with microporous polymers (particularly cellulosic polymers such as nitrocellulose), microporous metallic compounds (particularly microporous aluminum) antibody-binding proteins (available from Pierce Chemical Co., Rockford Ill.), bisphenol A polycarbonate, or the like. Additional information relating to the term "substrate" can be found in U.S. Ser. No. 09/964,212.

The invention accordingly relates to apparatuses and methods for acoustically ejecting fluid from a fluid reservoir. The inventive method provides an improved method for acoustically ejecting a droplet of fluid from a fluid reservoir contained in or located on a substrate. The reservoir containing a fluid is acoustically coupled to an acoustic ejector that produces acoustic radiation. The ejector is activated to generate pulses of acoustic radiation through the substrate, to a site at or near the surface of the fluid in the reservoir, in a manner effective to eject a droplet from the reservoir. In the improved method, prior to acoustically ejecting a droplet of fluid, the wave form of a perturbation pulse of acoustic radiation to be generated at said site is determined and the amplitude of the perturbation pulse of acoustic radiation generated at the site is adjusted to an acoustic energy output level sufficient to eject a fluid droplet.

In the method of the first embodiment, the amplitude of the drop forming pulse at a site is determined by acoustically coupling the acoustic ejector with the reservoir, activating the acoustic ejector to generate and direct a perturbation pulse at the site such that no fluid droplet will be ejected, and then generating a perturbation interrogation pulse at the fluid surface of the site. The perturbation interrogation pulse is reflected from the fluid surface. The analyzer then detects and extracts the perturbation interrogation pulse echo from the perturbation interrogation pulse response for further processing.

The processing of the reflected perturbation interrogation pulse includes analyzing its frequency spectrum. Analysis of the frequency spectrum includes using a frequency domain-based algorithm to identify the difference in frequency spacing between two minima of the echo portion of the reflected perturbation interrogation pulse. Optionally, the perturbation interrogation pulse response or the perturbation interrogation pulse echo can be processed to remove spurious noise or restrict the time domain signal to improve robustness of the analysis of the resulting FFT. The spacing between two minima is then used by the analyzer to increase the acoustic energy level of the perturbation pulse by the acoustic ejector to a level sufficient to eject a fluid droplet. In a preferred embodiment of the improved method, the frequency domain-based adaptive algorithm is a Fast Fourier Transform (FFT)-based algorithm.

The inventive apparatus includes a reservoir adapted to contain a fluid, and an acoustic radiation generator for generating acoustic radiation. The inventive apparatus also includes a means for bringing the reservoir and the acoustic radiation generator into an acoustically coupled relationship such that the acoustic radiation generated by the acoustic radiation generator is transmitted through the reservoir. Establishment of acoustic coupling between the reservoir and the acoustic radiation generator may involve either the motion of the reservoir, the acoustic generator or both. An analyzer for analyzing a pulse of acoustic radiation is positioned to receive pulses of acoustic radiation reflected from a site in the fluid in the reservoir. Typically, the pulses to be analyzed are received by the same apparatus that was used to generate the acoustic radiation as these apparatuses are composed of piezoelectric materials and are capable of converting electromagnetic energy to acoustic energy as well as converting acoustic energy back into electromagnetic energy.

The apparatus may also be constructed for use with a plurality of reservoirs wherein the reservoirs are an integrated or permanently attached component of the apparatus. However, to provide modularity and interchangeability of components, it is preferred that apparatus be constructed with removable reservoirs, and that it can operate with a plurality of these removable reservoirs. Generally, the reservoirs are arranged in a pattern or an array to provide each reservoir with individual systematic addressability. In addition, while each of the reservoirs may be provided as a discrete or stand-alone item, in circumstances that require a large number of reservoirs, it is preferred that the reservoirs are attached to each other or represent integrated portions of a single reservoir unit.

For example, the reservoirs may represent individual wells in a well plate. Many well plates suitable for use with the apparatus are commercially available and may contain, for example, 96, 384, 1536, or 3456 wells per well plate. Manufactures of suitable well plates for use in the employed apparatus include Corning, Inc. (Corning, N.Y.) and Greiner America, Inc. (Lake Mary, Fla.). However, the availability of such commercially available well plates does not preclude the manufacture and use of custom-made well plates containing at least about 10,000 wells, or as many as 100,000 to 500,000 wells, or more.

Furthermore, the material used in the construction of reservoirs must be compatible with the fluids contained therein. Thus, if it is intended that the reservoirs or wells contain an organic solvent such as acetonitrile, polymers that dissolve or swell in acetonitrile would be unsuitable for use in forming the reservoirs or well plates. Similarly, reservoirs or wells intended to contain DMSO must be compatible with DMSO. For water-based fluids, a number of materials are suitable for the construction of reservoirs and include, but are not limited to, ceramics such as silicon oxide and aluminum oxide, metals such as stainless steel and platinum, and polymers such as polyester, polypropylene, cyclic olefin copolymer, polystyrene, polycarbonate and polytetrafluoroethylene. For fluids that are photosensitive, the reservoirs may be constructed from an optically opaque material that has sufficient acoustic transparency for substantially unimpaired functioning of the apparatus.

In addition, to reduce the amount of movement and time needed to align the acoustic radiation generator with each reservoir or reservoir well during operation, discussed infra, it is preferable that the center of each reservoir be located not more than about 1 centimeter, preferably not more than about 1 millimeter, and optimally not more than about 0.5 millimeter, from a neighboring reservoir center. These dimensions tend to limit the size of the reservoirs to a maximum volume. The reservoirs are constructed to contain typically no more than about 1 mL, preferably no more than about 1 µL, and optimally no more than about 1 mL, of fluid. To facilitate handling of multiple reservoirs, it is also preferred that the reservoirs be substantially acoustically indistinguishable.

Generally, a single acoustic radiation generator is employed, though a plurality of acoustic radiation generators may be employed as well. All acoustic radiation generators employ a vibrational element or transducer to generate acoustic radiation. Often, a piezoelectric element is employed to convert electrical energy into mechanical energy associated with acoustic radiation. When a single acoustic radiation generator is employed, the positioning means should allow for the acoustic radiation generator to move from one reservoir to another quickly and in a controlled manner, thereby allowing fast and controlled scanning of the fluid in the reservoirs.

In order to ensure optimal performance, it is important to keep in mind that there are two basic kinds of motion: pulse and continuous. Pulse motion involves the discrete steps of coupling an acoustic radiation generator to a reservoir, keeping it stationary while it emits acoustic energy, and then coupling the generator to another reservoir, using a high performance positioning means with such a method allows repeatable and controlled acoustic coupling at each reservoir in less than 0.1 second. Typically, the pulse width is very short and may enable over 10 Hz reservoir transitions and even over 1000 Hz reservoir transitions. A continuous motion design, on the other hand, moves the acoustic radiation generator and/or the reservoirs continuously, although not at the same speed.

In some instances, the analyzer is positioned in fixed alignment with respect to the acoustic radiation generator. In other instances, however, a means similar to that described above is provided for altering the relative positions of the analyzer with respect to the reservoirs. The relative position of the analyzer and the acoustic radiation generator depends on the particular configuration of the apparatus. In some instances, the apparatus may be configured to operate in transmissive mode, such that the generated radiation is transmitted through the entirety of the reservoir from which a droplet of fluid is to be ejected. In such a case, the reservoir may be interposed between the acoustic radiation generator and an acoustic analyzer. As another option, the apparatus may be configured to operate in a reflective mode, such that the acoustic radiation is transmitted only through a portion of the reservoir from which a droplet of fluid is to be ejected. In such a case, the analyzer may be positioned in a manner appropriate for this configuration, e.g., in order to receive reflected acoustic radiation.

In any case, the acoustic radiation generator is positioned such that generated acoustic radiation is transmitted through each reservoir and the fluid in the reservoir to be reflected from a site at or near the surface of the fluid for optimal performance. For example, as fluids ordinarily flow to the bottom of containers or are driven there by centrifugation, the acoustic radiation generator should be positioned such that generated acoustic radiation is transmitted through the bottom of a reservoir.

In a preferred configuration, as discussed in detail below, the analyzer is positioned to receive acoustic radiation reflected from a site at or near a free surface of a fluid contained in each reservoir. In such a configuration, the acoustic radiation generator may comprise a component common to the analyzer. The component common to the acoustic radiation generator and the analyzer may be a vibrational element that converts one form of energy into another, e.g., a piezoelectric element that converts acoustic/mechanical energy to electrical energy.

The analyzer may be constructed to perform a number of functions. For example, the analyzer may be adapted to analyze a pulse of acoustic radiation to determine the waveform of a pulse of drop forming acoustic radiation to adjust the amplitude of such a pulse to an acoustic energy output level sufficient to eject a fluid droplet. In addition, or in the alternative, the analyzer may be adapted to analyze acoustic radiation to determine a volume of fluid in each reservoir for plate auditing purposes. Alternatively, a well plate of known properties, comprising a series of wells each containing a fluid of known volume and known composition could be used to calibrate the power system generating acoustic energy. Fluid properties that impact pulse amplitude include, but are not limited to, viscosity, surface tension and composition, including solid content, and impurity content.

Thus, the invention also provides a method for acoustically ejecting a droplet of fluid from each of a plurality of reservoirs. The method involves providing a plurality of reservoirs, each reservoir adapted to contain a fluid, and positioning an acoustic radiation generator and a selected reservoir in acoustic coupling relationship. Once positioned, the acoustic radiation generator is actuated to generate pulses of acoustic radiation that are transmitted through a selected reservoir and the fluid therein to a site at or near the surface of the fluid. The pulses of acoustic energy are then reflected from the site to an analyzer. The analyzer then processes a pulse of reflected acoustic radiation to adjust the amplitude of the pulse of acoustic radiation generated at each individual site on the substrate to an acoustic energy output level sufficient to eject a fluid droplet. In a preferred embodiment of the present invention, the acoustic radiation generator is successively acoustically coupled the remaining reservoirs to enable the analyzer to adjust the amplitude of the pulses of acoustic radiation in the fluid in the remaining reservoirs to a droplet forming level as well.

As discussed above, the reservoirs may be constructed to reduce the amount of movement and time needed to couple each of the reservoirs with the acoustic radiation generator during operation. As a general matter of convenience and efficiency, it is desirable to analyze an entire library of different moieties in a relatively short amount of time, e.g., about one minute. Thus, the inventive method typically allows for the analysis of the acoustic energy delivered to each site in the fluid in each of the reservoirs at a time between a first and a second reservoir of about two seconds. Faster analysis times between reservoirs of 0.25 seconds, 0.02 seconds and 0.005 seconds are achievable with present day technology as well. Thus, the invention can be operated to analyze acoustic energy at each site in the fluid in each well of most (if not all) well plates that are currently commercially available. Proper implementation of the inventive method should yield a reservoir analysis time between reservoirs of 0.001 seconds. Current commercially available positioning technology allows the acoustic radiation generator to be acoustically coupled with one reservoir after another, with repeatable and controlled acoustic coupling at each reservoir, in less than about 0.1 second for high performance positioning means and in less than about 1 second for ordinary positioning means. A custom designed system will allow repeatable and controlled acoustic coupling of the acoustic radiation generator to one reservoir after another within less than about 0.001 second.

By analyzing a pulse of acoustic radiation that has been transmitted to a site of the fluid in a selected reservoir, one may accurately determine the amplitude of the pulse in the fluid in the selected reservoir.

Acoustic ejection as described above may be employed to improve fluid dispensing from each of a plurality of reservoirs adapted to contain a fluid. Thus, another embodiment of the invention relates to an apparatus for ejecting droplets of fluid from each of a plurality of reservoirs adapted to contain a fluid. This apparatus may include any of a number of known techniques for ejecting droplets of fluid from a reservoir involving contact-based fluid dispensing, e.g., pin spotting, pipetting, and inkjet printing, or non-contact based fluid dispensing, e.g., acoustic ejection. However, the inventive apparatus represents a novel and nonobvious improvement over the fluid dispensing apparatuses known in the art since it provides for enhanced accuracy and precision in fluid dispensing through the use of a means for acoustically ejecting droplets of fluid from a reservoir. The means for acoustically assessing the fluid in the reservoirs is similar to the previously described apparatus for ejecting droplets of fluid from each of a plurality of fluid reservoirs in that it also comprises an acoustic radiation generator for generating acoustic radiation and an analyzer for analyzing a waveform of acoustic radiation. A means for acoustically coupling the acoustic radiation generator with each reservoir is used to ensure that acoustic radiation generated by the acoustic radiation generator is transmitted through each reservoir and the fluid therein to a site at or near the surface of such fluid. Furthermore, the analyzer is coupled to receive the reflected waveform of the transmitted acoustic radiation.

As discussed above, acoustic ejection provides a number of advantages over other fluid dispensing technologies. In addition, compatible acoustic ejection technology described in U.S. Ser. No. 09/964,212 involves an ejector comprising an acoustic radiation generator for generating acoustic radiation and a focusing means for focusing the acoustic radiation generated at a focal point within and sufficiently near the fluid surface in each of a plurality of reservoirs to result in the ejection of droplets there from. Optionally, a focusing means is typically provided for focusing the acoustic radiation generated by the acoustic generator. In the present invention, any of a variety of focusing means may be employed in conjunction with the acoustic generator in order to eject droplets from a reservoir through the use of focused acoustic radiation. For example, one or more curved surfaces may be used to direct acoustic radiation to a focal point near a fluid surface. One such technique is described in U.S. Pat. No. 4,308,547 to Lovelady et al. Focusing means with a curved surface have been incorporated into the construction of commercially available acoustic transducers such as those manufactured by Panametrics Inc. (Waltham, Mass.). In addition, Fresnel lenses are known in the art for directing acoustic energy at a predetermined focal distance from an object plane. See, e.g., U.S. Pat. No. 5,041,849 to Quate et al. Fresnel lenses may have a radial phase profile that diffracts a substantial portion of acoustic energy into a predetermined diffraction order at diffraction angles that vary radially with respect to the lens. The diffraction angles should be selected to focus the acoustic energy within the diffraction order on a desired object plane. Optimally, the apparatus is adapted to eject fluid from a reservoir according to the results of acoustic analysis performed by the analyzer.

The apparatus may also provide certain performance-enhancing functionalities. For example, the apparatus may include a means for controlling the temperature of one or more of the reservoirs. Such temperature controlling means may be employed in the inventive apparatus to improve the accuracy of measurement and may be employed regardless of whether the apparatus includes a fluid dispensing functionality. In the case of aqueous fluids, the temperature controlling means should have the capacity to maintain the reservoirs at a temperature above about 0° C. In addition, the temperature controlling means may be adapted to lower the temperature in the reservoirs. Such temperature lowering may be required because repeated application of acoustic energy to a reservoir of fluid may result in heating of the fluid. Such heating can result in unwanted changes in fluid properties such as viscosity, surface tension and density. Design and construction of such temperature controlling means are known to one of ordinary skill in the art and may comprise, e.g., components such a heating element, a cooling element, or a combination thereof. For many biomolecular applications, reservoirs of fluids are stored frozen and thawed for use. During use, it is generally desired that the fluid containing the biomolecule be kept at a constant temperature, with deviations of no more than about 1° C. or 2° C. there from. In addition, for a biomolecular fluid that is particularly heat sensitive, it is preferred that the fluid be kept at a temperature that does not exceed about 10° C. above the melting point of the fluid, preferably at a temperature that does not exceed about 5° C. above the melting point of the fluid. Thus, for example, when the biomolecule-containing fluid is aqueous, it may be optimal to keep the fluid at about 4° C. during ejection.

Moreover, the apparatus may be adapted to dispense fluids of virtually any type and amount desired. The fluid may be aqueous and/or nonaqueous. Examples of fluids include, but are not limited to, aqueous fluids including water per se and water-solvated ionic and non-ionic solutions, organic solvents, lipidic liquids, suspensions of immiscible fluids, and suspensions or slurries of solids in liquids. Because the invention is readily adapted for use with high temperatures, fluids such as liquid metals, ceramic materials, and glasses may be used; see, e.g., co-pending patent application U.S. Ser. No. 09/669/194 ("Method and Apparatus for Generating Droplets of Immiscible Fluids"), inventors Ellson and Mutz, filed on Sep. 25, 2000, and assigned to Picoliter, Inc. (Mountain View, Calif.). Furthermore, because of the precision that is possible using the inventive technology, the apparatus may be used to eject droplets from a reservoir adapted to contain no more than about 100 nanoliters of fluid, preferably no more than 10 nanoliters of fluid. In certain cases, the ejector may be adapted to eject a droplet from a reservoir adapted to contain about 1 to about 100 nanoliters of fluid. This is particularly useful when the fluid to be ejected contains rare or expensive biomolecules, wherein it may be desirable to eject droplets having a volume of about 1 picoliter or less, e.g., having a volume in the range of about 0.025 pL to about 1 pL.

Thus, another embodiment of the invention relates to a method for dispensing fluid from one or more reservoirs. Once an acoustic radiation generator is positioned, in acoustic coupling relation to a reservoir selected from a plurality of reservoirs, acoustic radiation generated by the acoustic radiation generator may be transmitted through the selected reservoir and the fluid therein to a site at or near the surface of such fluid. The reflected waveform of acoustic radiation is then analyzed in order to adjust the amplitude of the pulse of acoustic energy in the fluid in the reservoir, and droplets of fluid are dispensed from the selected reservoir according to the adjustment. Typically, the droplets of fluid are dispensed through acoustic ejection, though the inventive method may employ contact-based fluid dispensing either as an alternative to or as a supplement to noncontact-based fluid dispensing. Also, while the analysis of acoustic energy is conducted in the reflective mode, it should be apparent to one skilled in the art that such analysis is not limited thereto, but could be easily conducted in the transmissive mode along the lines suggested in FIG. 2 and discussed infra. Optionally, the above described processes may be repeated for additional reservoirs.

As discussed above, fluid may be dispensed from a reservoir by acoustic ejection. This allows an operator to fine tune the dispensing according to the condition of the fluid in the reservoir.

FIG. 1 illustrates a preferred embodiment of the inventive apparatus in simplified cross-sectional view. In this embodiment, the inventive apparatus allows for acoustic ejection of fluid droplets from a plurality of reservoirs. The inventive apparatus is shown in operation to form a biomolecular array bound to a substrate. As with all figures referenced herein, in which like parts are referenced by like numerals, FIG. 1 is not to scale, and certain dimensions may be exaggerated for clarity of presentation. The apparatus 11 includes a plurality of reservoirs, i.e., at least two reservoirs, with a first reservoir indicated at 13 and a second reservoir indicated at 15. Each is adapted to contain a fluid having a fluid surface. As shown, the first reservoir 13 contains a first fluid 14 and the second reservoir 15 contains a second fluid 16. Fluids 14 and 16 each have a fluid surface respectively indicated at 17 and 19. Fluids 14 and 16 may be the same or different. As shown, the reservoirs are of substantially identical construction so as to be substantially acoustically indistinguishable, but identical construction is not a requirement. The reservoirs are shown as separate removable components but may, as discussed above, be fixed within a plate 43 or other substrate. For example, the plurality of reservoirs may comprise individual wells in a well plate, optimally although not necessarily arranged in an array. Each of the reservoirs 13 and 15 is preferably axially symmetric as shown, having vertical walls 21 and 23 extending upward from circular reservoir bases 25 and 27 and terminating at openings 29 and 31, respectively, although other reservoir shapes may be used. The material and thickness of each reservoir base should be such that acoustic radiation may be transmitted there through and into the fluid contained within the reservoirs.

The apparatus also includes an acoustic ejector 33 comprised of an acoustic radiation generator 35 for generating acoustic radiation and a focusing means 37 for focusing the acoustic radiation at a focal point within the fluid from which a droplet is to be ejected, near the fluid surface. The acoustic radiation generator contains a transducer 36, e.g., a piezoelectric element, commonly shared by an analyzer. As shown, a combination unit 38 is provided that both serves as a controller and a component of an analyzer. Operating as a controller, the combination unit 38 provides the piezoelectric element 36 with electrical energy that is converted into mechanical and acoustic energy. Operating as a component of an analyzer, the combination unit receives and analyzes electrical signals from the transducer. The electrical signals are produced as a result of the absorption and conversion of mechanical and acoustic energy by the transducer.

As shown in FIG. 1, the focusing means 37 may comprise a single solid piece having a concave surface 39 for focusing acoustic radiation, but the focusing means may be constructed in other ways as discussed below. The acoustic ejector 33 is thus adapted to generate and focus acoustic radiation so as to eject a droplet of fluid from each of the fluid surfaces 17 and 19 when acoustically coupled to reservoirs 13 and 15, and thus to fluids 14 and 16, respectively. The acoustic radiation generator 35 and the focusing means 37 may function as a single unit controlled by a single controller, or they may be independently controlled, depending on the desired performance of the apparatus. Typically, single ejector designs are preferred over multiple ejector designs because accuracy of droplet placement and consistency in droplet size and velocity are more easily achieved with a single ejector.

There are also a number of ways to acoustically couple the ejector 33 to each individual reservoir and thus to the fluid therein. One such approach is through direct contact as is described, for example, in U.S. Pat. No. 4,308,547 to Lovelady et al., wherein a focusing means constructed from a hemispherical crystal having segmented electrodes is submerged in a liquid to be ejected. The aforementioned patent further discloses that the focusing means may be positioned at or below the surface of the liquid. However, this approach for acoustically coupling the focusing means to a fluid is undesirable when the ejector is used to eject different fluids in a plurality of containers or reservoirs, as repeated cleaning of the focusing means would be required in order to avoid cross-contamination. The cleaning process would necessarily lengthen the transition time between each droplet ejection event. In addition, in such a method, fluid would adhere to the ejector as it is removed from each container, wasting material that may be costly or rare.

Thus, a preferred approach would be to acoustically couple the ejector to the reservoirs and reservoir fluids without contacting any portion of the ejector, e.g., the focusing means, with any of the fluids to be ejected. To this end, the present invention provides an ejector positioning means for positioning the ejector in controlled and repeatable acoustic coupling with each of the fluids in the reservoirs to eject droplets there from without submerging the ejector therein. This typically involves direct or indirect contact between the ejector and the external surface of each reservoir. When direct contact is used in order to acoustically couple the ejector to each reservoir, it is preferred that the direct contact is wholly conformal to ensure efficient acoustic energy transfer. That is, the ejector and the reservoir should have corresponding surfaces adapted for mating contact. Thus, if acoustic coupling is achieved between the ejector and reservoir through the focusing means, it is desirable for the reservoir to have an outside surface that corresponds to the surface profile of the focusing means. Without conformal contact, efficiency and accuracy of acoustic energy transfer may be compromised. In addition, since many focusing means have a curved surface, the direct contact approach may necessitate the use of reservoirs having a specially formed inverse surface.

Optimally, acoustic coupling is achieved between the ejector and each of the reservoirs through indirect contact, as illustrated in FIG. 1A. In this figure, an acoustic coupling medium 41 is placed between the ejector 33 and the base 25 of reservoir 13, with the ejector and reservoir located at a predetermined distance from each other. The acoustic coupling medium may be an acoustic coupling fluid, preferably an acoustically homogeneous material in conformal contact with both the acoustic focusing means 37 and each reservoir. In addition, it is important to ensure that the fluid medium is substantially free of material having different acoustic properties than the fluid medium itself. Furthermore, it is preferred that the acoustic coupling medium is comprised of a material having acoustic properties that facilitate the transmission of acoustic radiation without significant attenuation in acoustic pressure and intensity. Also, the acoustic impedance of the coupling medium should facilitate the transfer of energy from the coupling medium into the container. As shown, the first reservoir 13 is acoustically coupled to the acoustic focusing means 37, such that an acoustic wave is generated by the acoustic radiation generator and directed by the focusing means 37 into the acoustic coupling medium 41, which then transmits the acoustic radiation into the reservoir 13.

In operation, reservoirs 13 and 15 are each filled with first and second fluids 14 and 16, respectively, as shown in FIG. 1. The acoustic ejector 33 is positioned by means of plate or ejector positioning means 43, shown below reservoir 13, in order to achieve acoustic coupling between the ejector and the reservoir through acoustic coupling medium 41. Positioning of reservoirs 13 and 15 could be accomplished by a reservoir positioning means (not shown) disposed between the reservoirs 13 or 15 and the plate 43. Once the ejector, the reservoir, and the substrate are in proper alignment, the acoustic radiation generator 35 is activated to produce acoustic radiation that is directed toward a free fluid surface 17 of the first reservoir. The acoustic radiation will then travel in a generally upward direction toward the free fluid surface 17. The waveform of the reflected acoustic radiation will differ based on the level and duration of acoustic energy delivered to the site of the fluid in the reservoir. For example, reflection will occur when there is a change in the acoustic property of the medium through which the acoustic radiation is transmitted. A portion of the acoustic radiation traveling upward will be reflected from the reservoir bases 25 and 27 as well as the free surfaces 17 and 19 of the fluids contained in the reservoirs 13 and 15.

As discussed above, acoustic radiation may be employed for use as an analytical tool as well as to eject droplets from a reservoir. In an analytical mode, the acoustic radiation generator is typically activated so as to generate low energy acoustic radiation that has insufficient acoustic energy to eject a droplet from the fluid surface. This is typically done by using an extremely short pulse (on the order of tens of nanoseconds) relative to that required for droplet ejection (on the order of microseconds). This is the type of pulse used for ranging. It is neither a perturbation pulse nor is it a perturbation interrogation pulse.

By determining the time it takes for the acoustic radiation to be reflected by the fluid surface back to the acoustic radiation generator, and then correlating that time with the speed of sound in the fluid, that distance, and thus the fluid height, may be calculated. Of course, care must be taken in order to ensure that acoustic radiation reflected by the interface between the reservoir base and the fluid is discounted.

Thus, the present invention represents a significant improvement over known technologies relating to the acoustic properties of the fluid in a plurality of reservoirs. As discussed above, the acoustic properties of the contents of fluid reservoirs typically involves placing a sensor in direct contact with the fluid. This means that the sensor must be cleaned between each use to avoid cross-contamination of the fluid in the reservoirs. In contrast, the invention allows for assessment of the fluid in a plurality of containers without direct contact with the fluid in the containers.

While other non-contact acoustic systems are known in the art, such systems provide only an indirect and approximate assessment of the fluid in a reservoir. For example, the acoustic system described in U.S. Pat. No. 5,880,364 to Dam employs a technique in which the acoustic radiation is transmitted from a sensor through an air-containing portion of the container and then reflected from the air-liquid interface of the container back to the sensor. The round trip transit time is used to determine the volume of the air-containing portion of the container. The volume of liquid in the container is determined by subtracting the volume of the container not occupied by the liquid from the volume of the entire container. One drawback of this technique is that it cannot provide an accurate assessment of the liquid volume in a container when the volume of the container is not precisely known. This is particularly problematic when small reservoirs such as those typically used in combinatorial techniques are employed. The dimensional variability for such containers is relatively large when considered in view of the small volume of the reservoirs. Furthermore, the technique cannot be employed when the volume of the container is completely unknown or alterable. Finally, since acoustic radiation never penetrates the liquid, the reflected radiation can at best only provide information relating to the surface of the liquid, not information relating to the bulk of the liquid. There would be little difference in the amplitude of the reflection from the liquid based on its composition since the acoustic impedance of air is essentially zero. Such a negligible impedance would cause essentially all the acoustic energy to be reflected from the fluid surface, so changes in the liquid impedance could not be detected based on changes in the reflection. Such changes would be lost in the accompanying noise.

In contrast, because the invention involves the transmission of acoustic radiation through the portion of each reservoir adapted to contain a fluid, the transmitted acoustic radiation may provide information relating to the volume as well as the properties of the fluid in the reservoir, such as acoustic impedance and the presence of impurities. For example, the invention provides a plurality of reservoirs, wherein a portion of each reservoir is adapted to contain a fluid. A fluid contained in a reservoir must ordinarily contact a solid surface of the reservoir. When the invention is employed in a reflective mode, some of the generated acoustic radiation may be reflected by the interface between the fluid and the solid surface, while the remainder is transmitted through the fluid contained in the reservoir. The transmitted radiation is then reflected by another surface, e.g., a free surface, of the fluid contained in the reservoir. By determining the difference in round-trip transit time between the two portions, the volume of the fluid in the reservoir may be accurately determined. In addition, transmission of acoustic radiation through the fluid allows characteristics of the acoustic radiation to be altered by that fluid. Thus, information relating to a property of the fluid may be deduced by analyzing a characteristic of the transmitted acoustic radiation.

In addition, air, like other gases, exhibits low acoustic impedance, and acoustic radiation tends to attenuate more in gaseous materials than in liquid or solid materials. For example, the attenuation at 1 MHz for air is approximately 10 dB/cm while that of water is 0.002 dB/cm. Since the acoustic system described in U.S. Pat. No. 5,880,364 to Dam requires acoustic radiation to travel through air, this system requires much more energy to operate. Thus, the present invention represents a more energy efficient technology that may be employed to provide more accurate and detailed information about the properties of the fluid in each of a plurality of fluid reservoirs. Some of this additional accuracy can be achieved by using higher frequency acoustic waves (and hence shorter wavelengths), as these acoustic waves can be transmitted effectively through fluids yet would be very rapidly attenuated in air.

It will be appreciated by those of ordinary skill in the art that conventional or modified sonar techniques may be employed. Thus, the acoustic radiation will be reflected back at the piezoelectric element 36, where the acoustic energy will be converted into electrical energy for analysis. The analysis may be used, for example, to reveal whether the reservoir contains any fluid at all. If fluid is present in the reservoir, the location and the orientation of the free fluid surface within the reservoir may be determined, as well as the overall volume of the fluid. Characteristics of the reflected acoustic radiation may be analyzed in order to assess the spatial relationship between the acoustic radiation generator and the fluid surface, the spatial relationship between a solid surface of the reservoir and the fluid surface, as well as to determine a property of the fluid in each reservoir, e.g., viscosity, surface tension, acoustic impedance, acoustic attenuation, solid content, and impurity content. Once the analysis has been performed, a decision may be made as to whether and/or how to dispense fluid from the reservoir.

Depending on the type of assessment to be carried out, various techniques known in the art may be adapted for use in the present invention. Generally, interfacial energy measurements are routinely carried out using contact-angle measurement. The present invention may be adapted to perform such contact-angle measurements. In addition, a number of other acoustic assessment techniques are known in the art. For example, U.S. Pat. No. 4,391,129 to Trinh described a system for monitoring the physical characteristics of fluids. The physical characteristic may be determined from acoustic assessment of the interfacial tension of fluids to a high degree of accuracy. U.S. Pat. No. 4,558,589 to Hemmes describes an ultrasonic blood-coagulation monitor. U.S. Pat. No. 5,056,357 to Dymling et al. described acoustic methods for measuring properties in fluids through Doppler shifts. Other acoustic assessment techniques that may be adapted for use in the present invention are described, for example, in U.S. Pat. Nos. 4,901,245; 5,255,564; 5,410,518; 5,471,872; 5,533,402; 5,594,165; 5,623,095; 5,739,432; 5,767,407; 5,793,705; 5,804,698; 6,119,510; 6,227,040; and 6,298,726.

In order to form a biomolecular array on a substrate using the inventive apparatus, substrate 45 is positioned above and in proximity to the first reservoir 13 such that one surface of the substrate, shown in FIG. 1 as underside surface 51, faces the reservoir and is substantially parallel to the surface 17 of the fluid 14 therein. Once the ejector, the reservoir, and the substrate are in proper alignment, the acoustic radiation generator 35 is activated to produce acoustic radiation that is directed by the focusing means 37 to a focal point 47 near the fluid surface 17 of the first reservoir. That is, an ejection acoustic wave having a focal point near the fluid surface is generated in order to eject at least one droplet of the fluid, wherein the optimum intensity and directionality of the ejection acoustic wave is determined using the aforementioned analysis, optionally in combination with additional data. The "optimum" intensity and directionality are generally selected to produce droplets of consistent size and velocity. For example, the desired intensity and directionality of the ejection acoustic wave may be determined by using the data from the above-described assessment relating to reservoir volume or fluid property data, as well as geometric data associated with the reservoir. In addition, the data may show the need to adjust the relative position of the acoustic radiation generator with respect to the fluid surface, in order to ensure that the focal point of the ejection acoustic wave is near the fluid surface, where desired. For example, if analysis reveals that the acoustic radiation generator is positioned such that the ejection acoustic wave cannot be focused near the fluid surface; the acoustic radiation generator and/or the reservoir is repositioned using vertical, horizontal, and/or rotational movement to allow appropriate focusing of the ejection acoustic wave.

As a result, droplet 49 is ejected from the fluid surface 17 onto a designated site on the underside surface 51 of the substrate. The ejected droplet may be retained on the substrate surface by solidifying thereon after contact; in such an embodiment, it may be necessary to maintain the substrate at a low temperature, i.e., a temperature that results in droplet solidification after contact. Alternatively, or in addition, a molecular moiety within the droplet attaches to the substrate surface after contract, through adsorption, physical immobilization, or covalent binding.

Figure 1B:
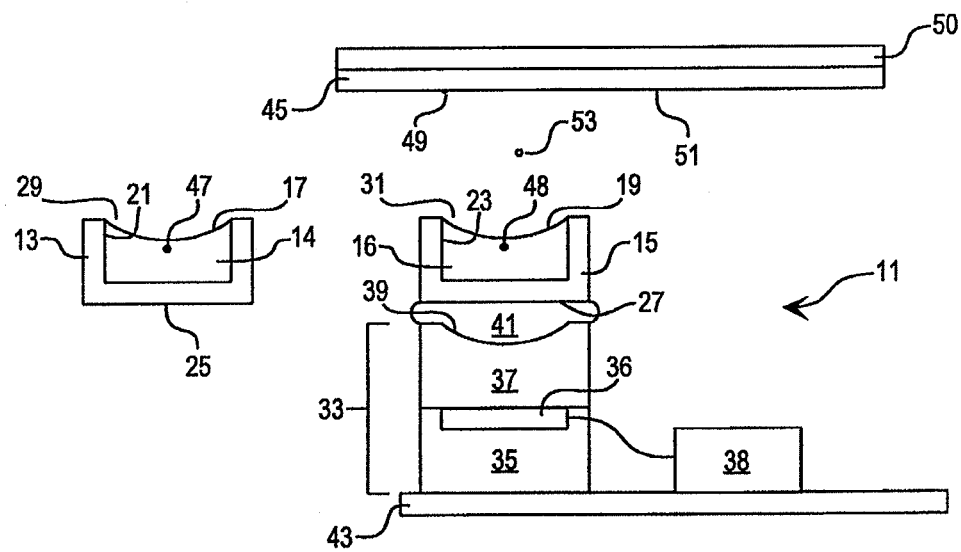

Then, as shown in FIG. 1B, a substrate positioning means 50 repositions the substrate 45 over reservoir 15 in order to receive a droplet there from at a second designated site. FIG. 1B also shows that the ejector 33 has been repositioned by the ejector positioning means 43 below reservoir 15 and in acoustically coupled relationship thereto by virtue of acoustic coupling medium 41. Once properly aligned, the acoustic radiation generator 35 of ejector 33 is activated to produce low energy acoustic radiation to assess the fluid in the reservoir 15 and to determine whether and/or how to eject fluid from the reservoir. Historical droplet ejection data associated with the ejection sequence may be employed as well. Again, there may be a need to reposition the ejector and/or the reservoir so as to create the proper distance between the acoustic radiation generator and the fluid surface, in order to ensure that the focal point of the ejection acoustic wave is near the fluid surface, where desired. Should the results of the assessment indicate that fluid may be dispensed from the reservoir, focusing means 37 is employed to direct higher energy acoustic radiation to a focal point 48 within fluid 16 near the fluid surface 19, thereby ejecting droplet 53 onto the substrate 45.

It will be appreciated that various components of the apparatus may require individual control or synchronization to form an array on a substrate. For example, the ejector and/or reservoir positioning means may be adapted to eject droplets from each reservoir in a predetermined sequence associated with an array to be prepared on a substrate surface. Similarly, the substrate positioning means for positioning the substrate surface with respect to the ejector and/or reservoir may be adapted to position the substrate surface to receive droplets in a pattern or array thereon. Any or all positioning means, i.e., the ejector positioning means, the reservoir positioning means and the substrate positioning means, may be constructed from, for example, motors, levers, pulleys, gears, a combination thereof, or other electromechanical or mechanical means known to one of ordinary skill in the art. It is preferable to ensure that there is a correspondence between the movement of the substrate, the movement of the reservoirs, the movement of the ejector, and the activation of the ejector to ensure proper array formation.

Accordingly, the invention relates to the assessment of the fluid in a plurality of reservoirs as well as to dispensing a plurality of fluids from reservoirs, e.g., in order to form a pattern or an array, on the substrate surface 51. However, there are a number of different ways in which content assessment and fluid dispensing may relate to each other. That is, a number of different sequences may be employed for assessing the fluid in the reservoirs and for dispensing fluids there from. In some instances, the fluid in a plurality of reservoirs may be assessed before fluid is dispensed from any of the reservoirs. In other instances, the fluid in each reservoir may be assessed immediately before fluid is dispensed there from. The sequence used typically depends on the particular fluid-dispensing technique employed as well as the intended purpose of the sequence.

Figure 2:
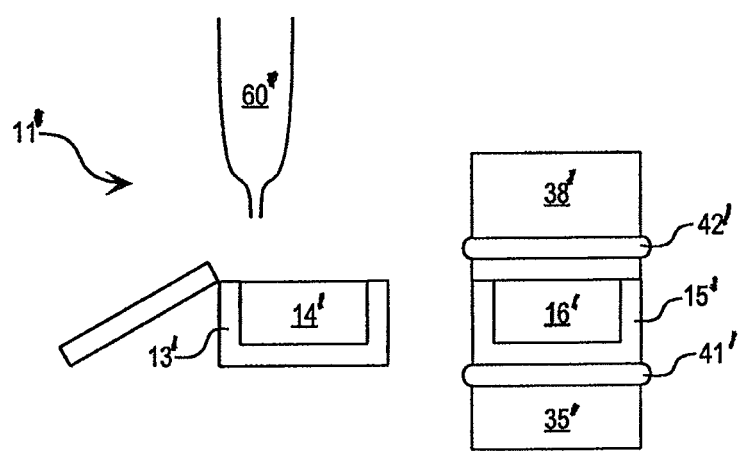
FIG. 2 schematically illustrates in simplified cross-sectional view an embodiment of the inventive apparatus designed to process information obtained from the reflective acoustic energy obtained from a wave form generated by the ejector.

FIG. 2 illustrates an example of the inventive apparatus that provides for assessment of the fluid in a plurality of reservoirs in transmissive mode rather than in reflective mode. Considerations for the design and construction of this apparatus are similar to those discussed above. Thus, an apparatus 11' includes a first reservoir 13' and a second reservoir 15', each adapted to contain a fluid indicated at 14' and 16', respectively, and each of substantially identical construction. The first reservoir 13' is depicted in an open state, while the second reservoir is depicted in a sealed state. An acoustic radiation generator 35' is positioned below the reservoirs, and analyzer 38' is positioned in opposing relationship with the acoustic radiation generator 35' above the reservoirs.

In operation, the fluid in each of the reservoirs is acoustically evaluated before pipette 60' is employed to dispense fluid there from. As shown, the contents 14' of the first reservoir 13' have already been acoustically assessed. As the assessment has revealed that the first reservoir 13' contains at least a minimum acceptable level of fluid 14', the first reservoir 13' is open and ready for fluid to be dispensed there from via pipette 60'. The contents 16' of the second reservoir 15' are undergoing acoustic assessment, as depicted by FIG. 2, as the second reservoir 15' is interposed between the acoustic radiation generator 35' and the analyzer 38'. The acoustic radiation generator 35' and the analyzer 38' are acoustically coupled to the second reservoir via coupling media 41' and 42', respectively. Once the acoustic radiation generator 35', the second reservoir 15', and the analyzer 38' are in proper alignment, the acoustic radiation generator 35' is activated to produce acoustic radiation that is transmitted through the reservoir 15' and its contents 16' toward the analyzer 38'. The received acoustic radiation is analyzed by an analyzer 38' as described above.

Figure 3A:
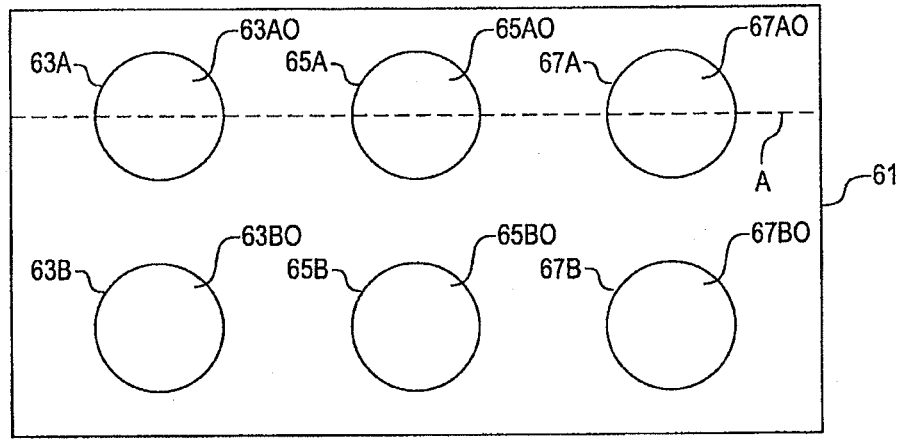
FIGS. 3A-3C, collectively referred to as FIG. 3, schematically illustrate a rectilinear array of reservoirs in the form of a well plate having three rows and two columns of wells each having a low height-to-diameter ratio.
Figure 3B:
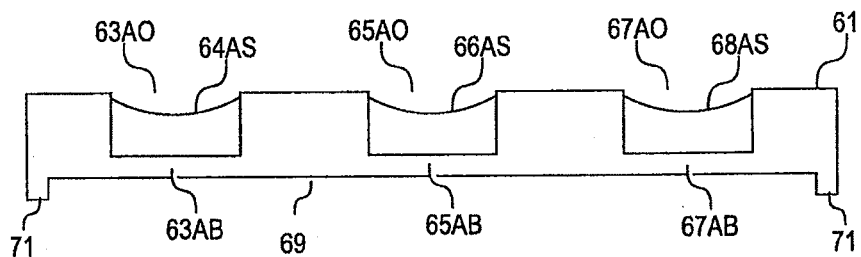
Figure 3C:
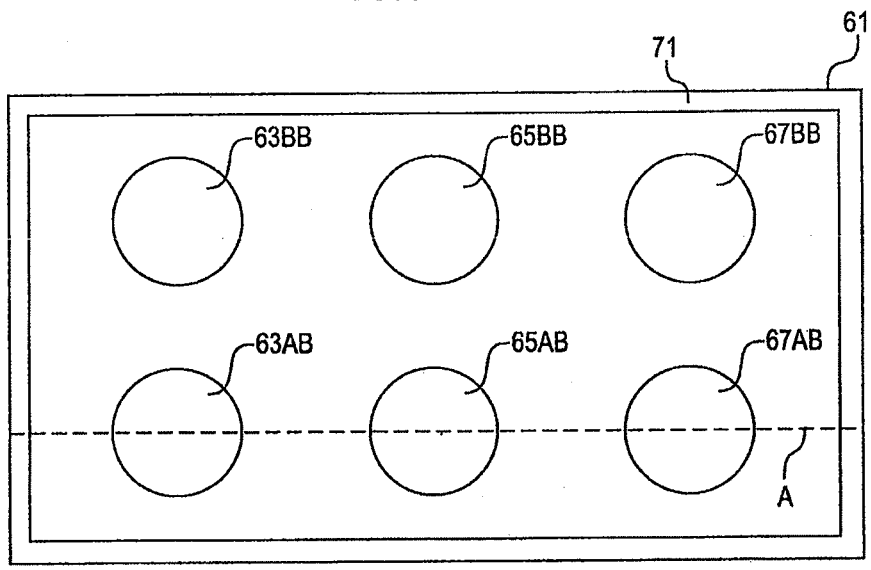

FIG. 3 schematically illustrates an exemplary rectilinear array of reservoirs in a well plate that may be used with the invention. Well plate configurations can include from 96, 192, 384, to as many as 100,000 wells on a plate. Such configurations may also be asymmetric. The configuration of FIG. 3 is provided for simplicity of understanding. The reservoir array is provided in the form of a well plate 61 having three rows and two columns of wells. As depicted in FIGS. 3A and 3C, wells of the first, second, and third rows of wells are indicated at 63A and 63B, 65A and 65B, and 67A and 67B, respectively. Each is adapted to contain a fluid having a fluid surface. As depicted in FIG. 3B, for example, reservoirs 63A, 65A, and 67A contain fluids 64A, 66A, and 68A, respectively. The fluid surfaces for each fluid are indicated at 64AS, 66AS, and 68AS. As shown, the reservoirs have a height-to diameter-ratio less than one and are of substantially identical construction so as to be substantially acoustically indistinguishable, but identical construction is not a requirement. Each of the depicted reservoirs is axially symmetric, having vertical walls extending upward from circular reservoir bases indicated at 63AB, 63BB, 65AB, 65BB, 67AB, and 67BB, and terminating at corresponding openings indicated at 63AO, 63BO, 65AO, 65BO, 67AO, and 67BO. The bases of the reservoirs form a common exterior lower surface 69 that is substantially planar. Although a full well plate skirt (not shown) may be employed that extends from all edges of the lower well plate surface, as depicted, partial well plate skirt 71 extends downwardly from the longer opposing edges of the lower surface 69. The material and thickness of the reservoir bases are such that acoustic radiation may be transmitted there through and into the fluid contained within the reservoirs.

Measurements were performed to determine the utility of echoing off a fluid surface in a reservoir at a sub threshold level, as a meaningful way to set ejection power. A perturbation pulse of 100 μsec duration was used to generate a surface perturbation or dimple. Then a series of 50 perturbation interrogation pulses are excited by a tone burst having the same wave form as the initial waveform, every 50 μsec after the initial pulse. The center frequency of the tone burst was 10 MHz.

Figure 4A:
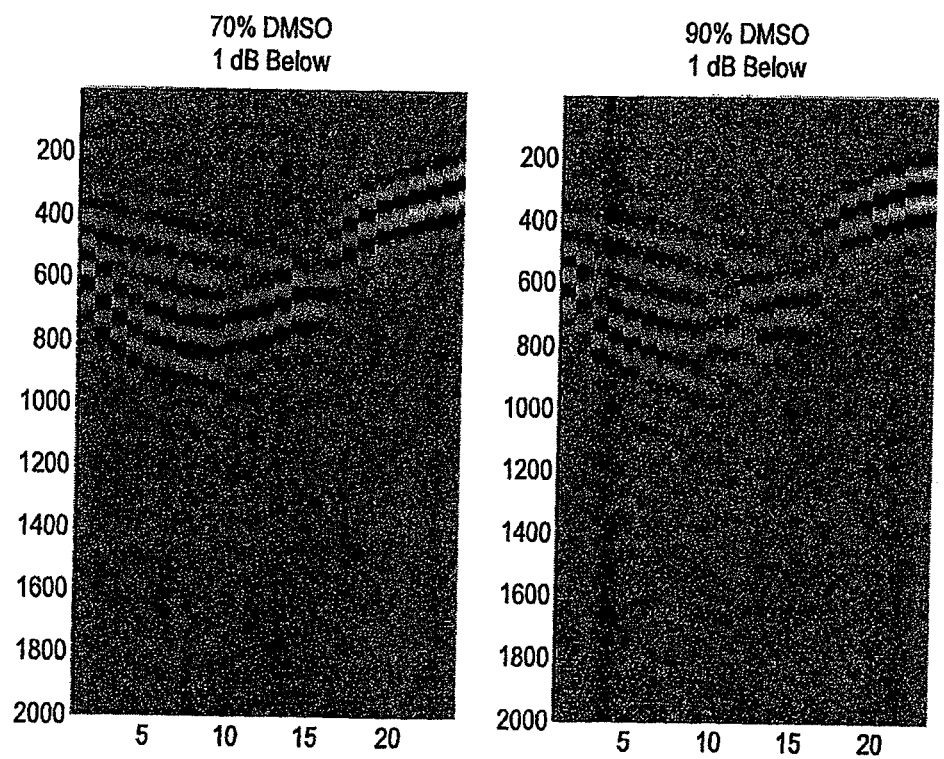
FIGS. 4A-4C, collectively referred to as FIG. 4, are a series of images of the perturbed surface of a fluid in a reservoir.
Figure 4B:
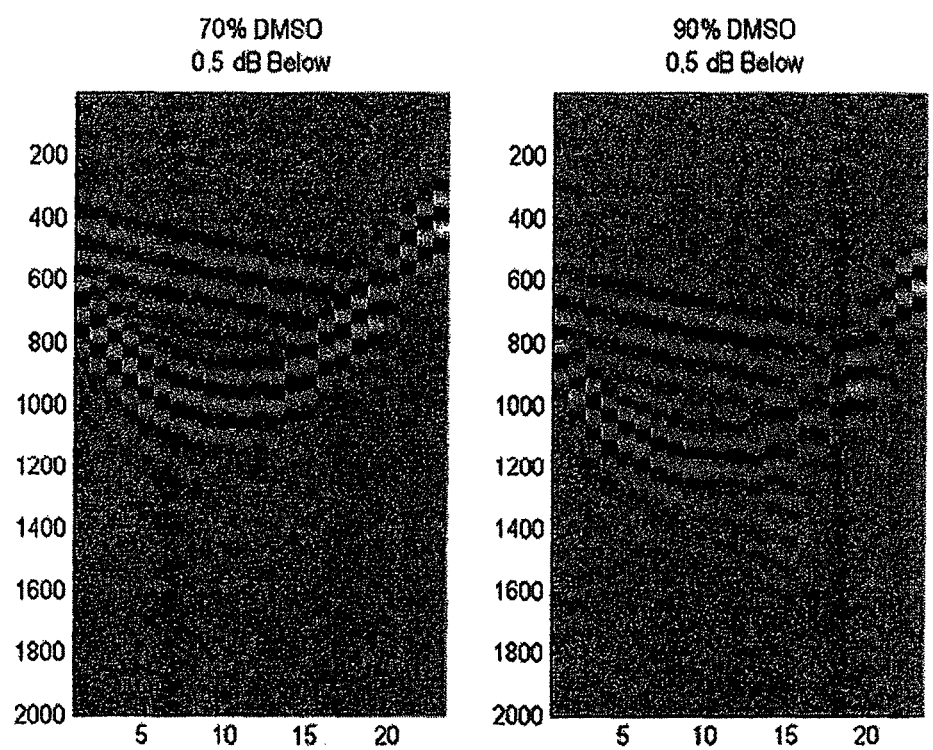
Figure 4C:
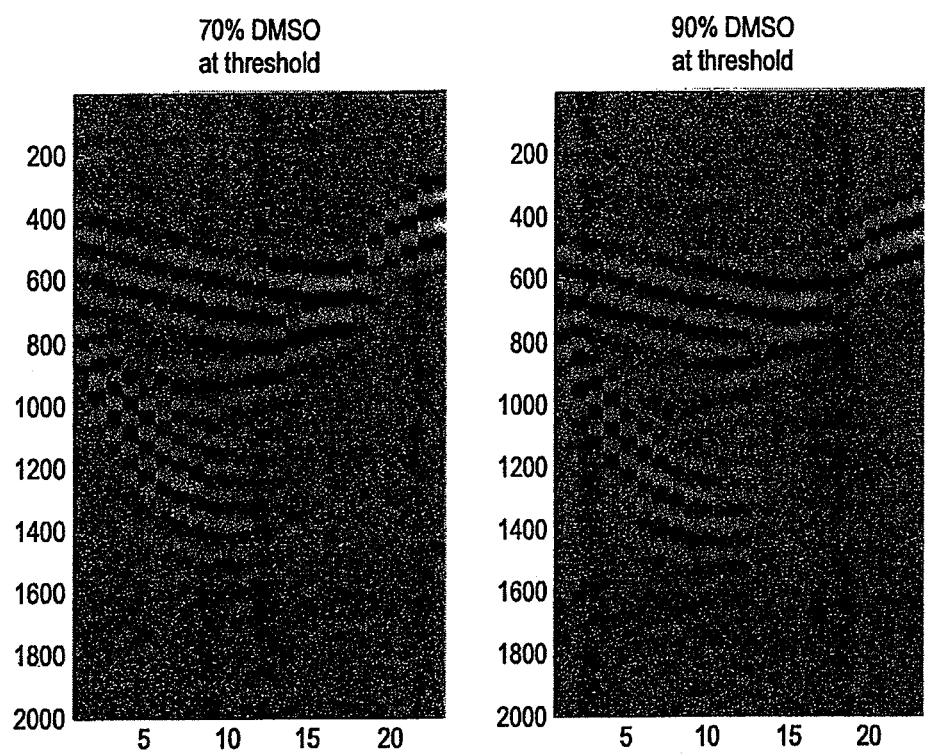

From the data, echo "images" were constructed. In FIGS. 4A-4C, along the horizontal axis, each column in the image corresponds to a perturbation interrogation pulse response signal displayed using a gray-scale intensity corresponding to its relative amplitude. The first perturbation interrogation pulse is launched 200 μsec after the initial tone burst excitation. It should be noted that the duration of the pulse is selected to approximate that of a drop forming pulse. In general, smaller drops require shorter durations and could be 0.5 μsec or shorter. Larger drops may require durations of 1000 μsec or longer.

The response from this perturbation interrogation pulse is plotted in the leftmost column in the image. The next column in the image is the perturbation interrogation pulse response, from the second perturbation interrogation pulse, which launched 50 µsec after the first perturbation interrogation pulse, and so on. Along the vertical direction of the image, ranging from the top down, the first 2000 nanoseconds of each perturbation interrogation pulse response are quantized into pixels and composited to form a grayscale image.

The echo "images" pertain to different DMSO concentrations. In FIGS. 4A-4C are shown echo images of 70% DMSO and 90% DMSO, for tone burst excitations of 1 dB (FIG. 4A), 0.5 dB (FIG. 4B), and 0 dB (FIG. 4C) below an ejection threshold level.

From the figures it is evident that the images are remarkably similar across the two DMSO concentrations. The tone burst excitation levels for the different DMSO concentrations are always quoted relative to the ejection threshold for those concentrations, but the absolute ejection thresholds are quite different between 70% and 90% DMSO (on the order of 1.0 dB). This corresponds mostly to the significant difference in viscosity between 70% and 90% DMSO.

Thus, even though the absolute power set points are quite different between each pair of images, the images appear very similar. This "universality" of the echo images, when considered relative to ejection threshold, implies that it should be possible to use the echo images as a means to determine the ejection threshold power, without needing to know the DMSO concentration. (Presumably, one could determine the DMSO concentration using echoing, by looking at the fluid surface perturbation over longer time scales, and hence extracting the viscosity of the fluid. But such a measurement could be somewhat slow for some applications). Refer to U.S. patent application Ser. No. 10/310,638, entitled "Acoustic Assessment of Fluids in a Plurality of Reservoirs," assigned to the assignee of the subject application and herein incorporated by reference for a more detailed discussion of methods for measuring DMSO content of a fluid in a reservoir as well means for measuring such fluid properties as, viscosity and surface tension.

Using images like those shown in FIGS. 4A-4C, one can determine the droplet ejection threshold level of an unknown fluid by extracting similar features from one or two echo images made using perturbation pulses or tone bursts, to capture a value that corresponds to the "gap" between two echoes from a given pulse as they split (along the vertical direction) in the range between 0 to 15 along the horizontal axis of the images. This gap, which presumably corresponds to size of the fluid dimple caused by the perturbation of the fluid surface from the acoustic energy and can be used to quantify information in the images.

Figure 5:
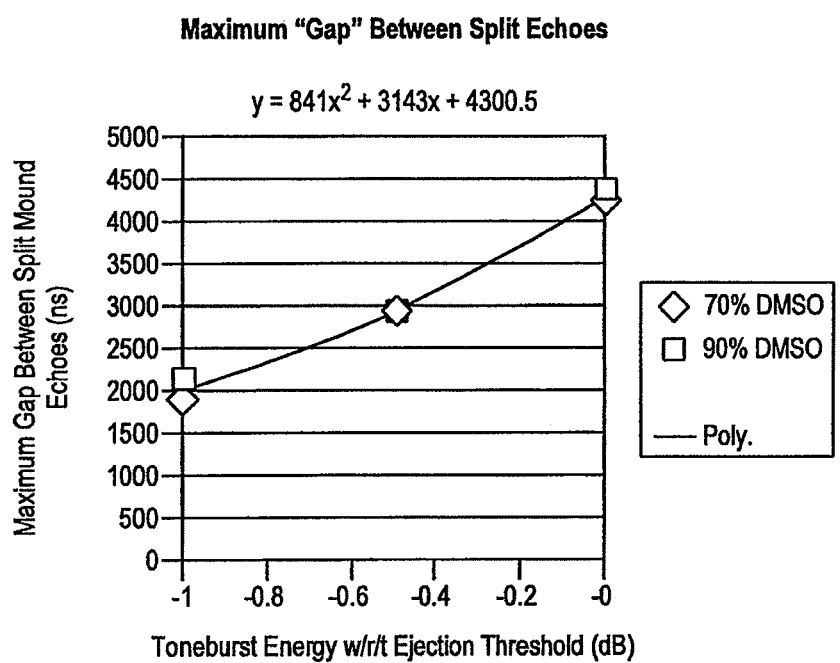
FIG. 5 is a chart showing a chart of the spacing between two minima for the tone burst inputs and the DMSO concentrations associated with FIGS. 4A-4C.

FIG. 5 shows a chart of the maximum "gap" between the split echoes, for the tone burst powers and DMSO concentrations associated with FIGS. 4A through 4C. While the curve of FIG. 5 provides an alternative means to predict droplet ejection threshold energy, from an echo image associated with a particular perturbation tone burst, the method is labor intensive, with significantly increased processing times.

For example, if a tone burst of energy 0.71 dB below droplet ejection threshold was used, and the resulting echo image was processed to obtain a maximum "gap" between the split echoes of 2536 ns, when the quadratic curve of FIG. 5 was inverted, the resulting curve corresponds to a tone burst power 0.68 dB below threshold. Thus, from the echo image used here, it is possible to predict the ejection threshold energy to within 0.03 dB.

Using a data processing method employing the Fast Fourier Transform (FFT), a single echo can be collected and processed to provide similar estimations of the required additional acoustic energy to create a droplet at the threshold of ejection. This has substantial advantages over the process used supra to product the better feature extraction algorithms for the images shown in FIGS. 4A-4C. Processing echo measurements using the FFT approach substantially improves the efficiency of fluid delivery for many drop ejection applications. Going from the time domain to the frequency domain is the key feature in enabling one to use an echo pulse (rather than many measured reflections) to get a good prediction of how much more energy is required to get to threshold. While the FFT approach to data analysis operates in the frequency domain and may be more efficient, this is just one approach to the analysis of acoustic data, other approaches are possible and useful. For example, a method of data analysis in the time domain is set forth infra.

Figure 6:
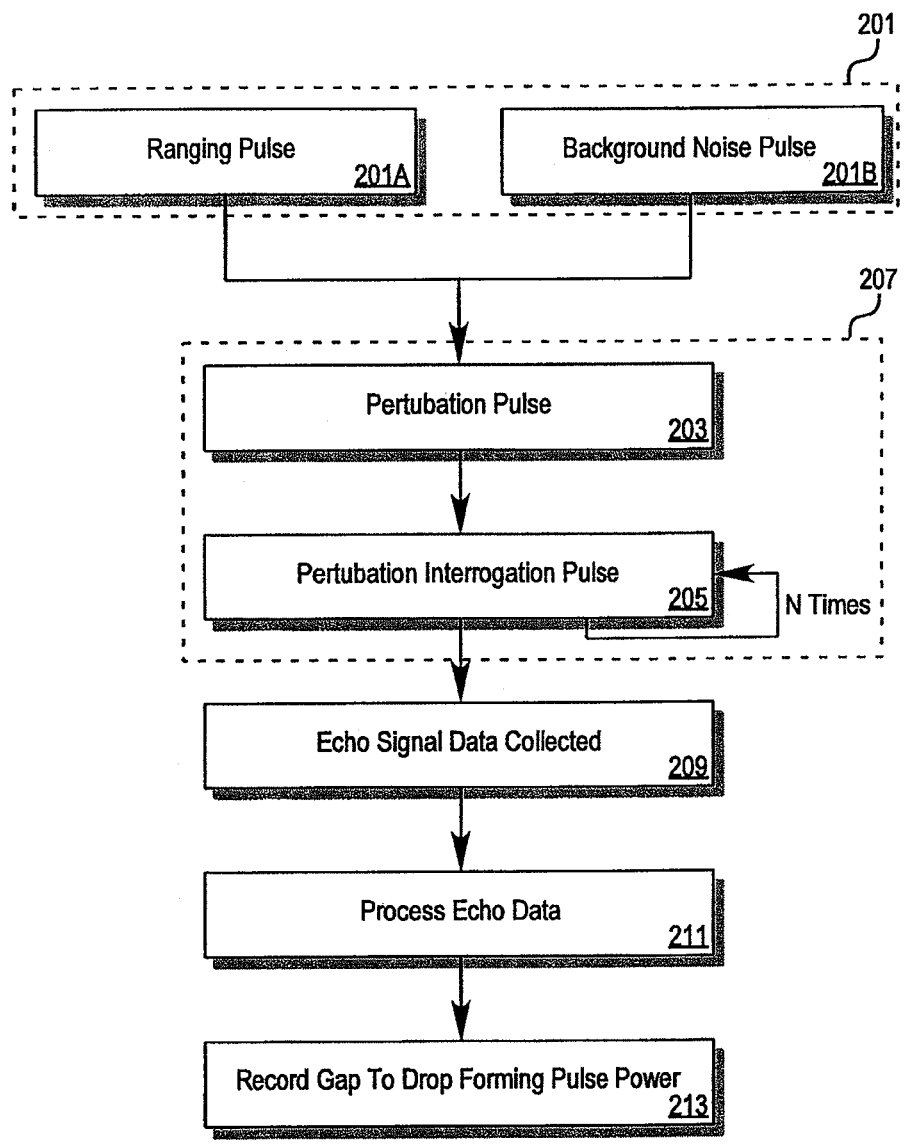
FIG. 6 is a flow chart of the algorithm for the spacing between two minima of the present invention.

A method useful in the analysis of acoustic "echo" data is shown in FIG. 6. To determine the amount of acoustic energy necessary to increase a perturbation pulse to the level of a droplet forming pulse, the algorithm 200 includes the following steps.

In an initial optional first step 201A, a ranging pulse can be used to determine the fluid height in the well so that the coupling of the transducer and the fluid surface is sufficient for the perturbation pulse to be in focus at the site. This information also provides data on the range in time where acoustic energy reflected from the fluid surface would be expected to return to the transducer, and this can reduces the amount of data sampling and expedites analysis of the pulse echoes.

In an initial optional second step 201B, a background noise pulse can be used to determine the magnitude of the background noise from acoustic reflections from the fluid surface. This background noise result can then be applied to extract background noise from other reflected acoustic pulses from the fluid surface. For example, knowledge of the background noise characteristics of reflected signals can be used to improve processing of signals (i.e., the signal to noise ratio) of the perturbation interrogation pulse echo and such techniques are familiar to those of skill in the art.

Optionally, the ranging pulse and the background noise pulse can be the same pulse 201. The reflected energy in the "combined" pulse can be processed to extract both the ranging information and the background noise characteristics.

In a next step 203, a perturbation pulse is sent to the fluid site to perturb the fluid surface and preferably is not a drop forming pulse, but a pulse with a similar waveform at a lower energy level.

In a next step 205, one or more perturbation interrogation pulses are sent to the fluid site to be reflected from the now perturbed fluid surface.

Optionally, the pulses of steps 203 and 205 can be combined into a single waveform 207.

In step 209, the reflected acoustic energy from the one or more perturbation interrogation pulses of step 205 form the perturbation interrogation pulse echo(s) and are collected by the transducer for analysis.

In step 211, the data is processed to estimate the gap between the power in the perturbation pulse and the power required for a drop forming pulse. This step can be accomplished by a variety of means as described elsewhere in more detail, and it can optionally include the results of the analysis of the ranging pulse, background noise pulse in addition to the one or more perturbation interrogation pulses. The analysis can consist of either processing in the time or frequency domain.

In step 213, the result of the gap in drop forming power is recorded. This data and other associated information can be stored in a data base or other comparable format for later use in plate auditing. The data collection means can be any suitable media provided with the analyzer, such as tape, CD-ROM or other media formats.

An example of algorithm 200, assumes the ranging pulse and the background noise pulse information is not required. A perturbation pulse is about 275 microseconds in length is sent to the fluid site. After an interval of about 300 microseconds a single perturbation interrogation pulse are sent as a combined waveform about 575 microseconds long. The reflected pulse or the perturbation interrogation pulse response is similar in length (about 600 microseconds). The portion of the perturbation interrogation pulse response that is subject to processing by an FFT to determine spacing between two minima (the perturbation interrogation pulse "echo") is only about 2 microsecond long and occurs about 550 to 600 microseconds into the perturbation interrogation pulse response. The selection of the time domain data for FFT processing is based on the ranging pulse echo time, background noise data and the location of the low frequency preamble.

Figure 7A:
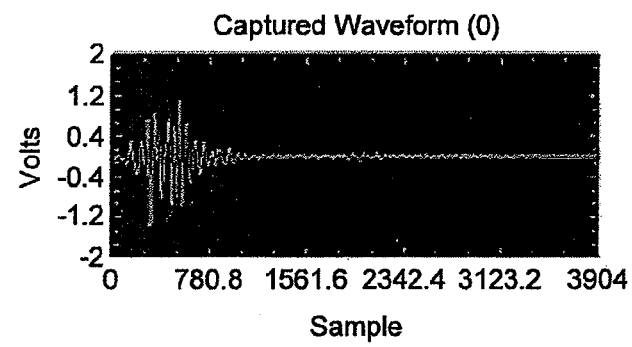
FIGS. 7A-7C, collectively referred to as FIG. 7, illustrate the wave forms processed by the analyzer using the algorithm of FIG. 6.

FIG. 7a is a time trace, essentially equivalent to one column in FIG. 4. The spacing between minima in FIG. 7c is inversely related to the 'gap' between the split echoes of FIG. 4. While using the FFT is more efficient as an algorithm, in theory one could measure the gap along a given column in FIG. 4, to obtain comparable information to create the chart shown. It is possible to map one minima spacing in the FFT to a particular energy below ejection threshold, only because there is a model for relating the spacing to the threshold energy i.e., energy relative to ejection threshold=A*in (spacing)+B. This relationship holds well for different fluids, different acoustic frequencies and other parameters. The A and B parameters are determined off-line before making the measurement on a given plate. The A and B parameters will vary somewhat with acoustic frequency, fluid composition and related parameters. A and B are more sensitive to frequency than DMSO concentration.

Figure 7B:
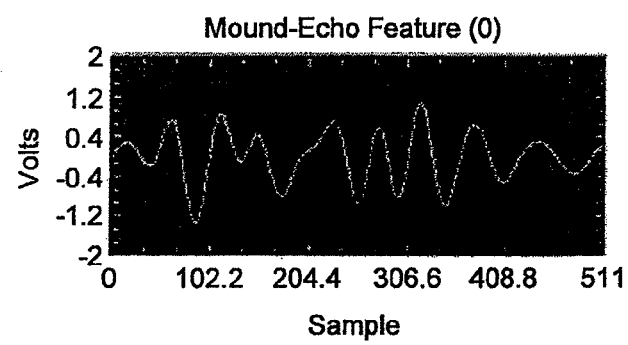
Figure 7C:
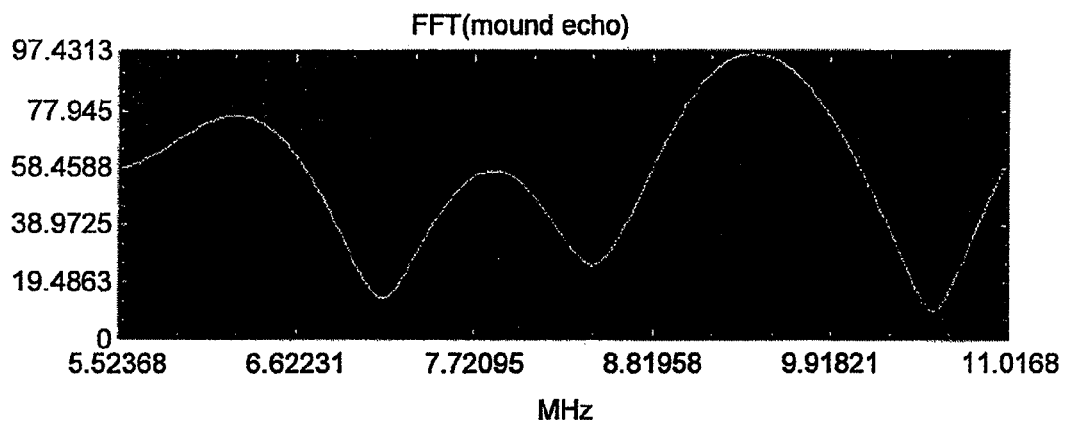

If the 'gap' between the split echoes was found in the time domain, there would be a relationship similar to FIG. 7, e.g., energy relative to ejection threshold=A*ln(1/gap)+B. The flow chart of FIG. 6 is just the best approach. With the use of advanced data processing techniques, perturbation interrogation pulse echoes can be processed to yield comparable data at a speed limited only by the processing power of the analyzer used.

The perturbation interrogation pulse response is the entire acquired signal that comes back as the perturbation interrogation pulse is reflected from the fluid surface responding to the earlier perturbation pulse. From this signal, the portion of the signal that contains the echo data from the perturbation interrogation pulse that is nominally 200-300 μs past the perturbation tone burst. We subsequently proceed to operate on the FFT of this time-domain data.

The Low-Frequency Preamble is the low frequency noise or interference that can interfere with the reflected signal and may have to be removed before the can be analyzed.

There are two other possible applications for the algorithm of FIG. 6—one can envision these applications as iteratively invoking the series of steps 201-213 as shown in FIG. 6. One such application is the creation of a plate "energy signature" by moving from well to well using the algorithm of FIG. 6 (once, or perhaps multiple times to average out any noise) and map the returned minima-spacing in MHz to energy below drop ejection threshold in dB. Holding everything constant (e.g., the magnitude of the perturbation pulse) and all things being equal (e.g., the volume and composition of the fluid in each reservoir), as one traverses across the plate, the variation in the energy below drop ejection threshold provides a good measure as to the variation in energy (as a function of well position) that one needs to compensate for during drop ejection. This variation is attributed to the differences in the transmission characteristics of the plate to acoustic energy. A map of the difference in energy from well to well can be saved for future use in determining the level of drop forming pulses for the wells of plates believed to have similar energy signatures. This mapping method does not require any new measurement algorithms as the measurement of drop ejection threshold for each reservoir in the plate is the same as the above application for finding the proper energy level for the drop forming pulse.

The second application is the use of the drop ejection threshold to calibrate the power system of the acoustic radiation generator. This approach is based on using a known volume of a fluid of known composition in a well of known structure and composition. Previous testing, as perhaps done in an audit or a controlled loading of a reservoir, would provide a known threshold level for droplet ejection, for example, 8.0 dB. If an ejector was placed in acoustic coupling relationship with the well and the power input to the ejector was increased until the threshold level was reached, it might be presumed that the power input level of the ejector was at 8.0 dB. However if the power level was decreased by a known increment, and the algorithm of FIG. 6 was performed at what was presumed to be a known lower level, and the gap in power measured between the perturbation pulse and the threshold of ejection plus this sub-threshold power setting did not equal 8.0 dB, the power setting for the ejector would be erroneous. However, a series of such incremental sub threshold measurements, with the use of the algorithm like the algorithm of FIG. 6 would enable one to do a power calibration of an acoustic ejector system. This calibration would bring the expected power required for ejection in line with the actual power for ejection. Note that since the response of the acoustic power system changes with frequency content of the pulses, this calibration would best be performed for pulses with frequency content that matched the frequency content required for the drop forming pulse of the said known fluid composition. Hence, if multiple fluid compositions were present on a single substrate, optimally, the power system calibration would perform for each fluid composition using the appropriate wave form associated with the drop forming pulse for each fluid composition.

One approach to the calibration system is set forth below. In the example provided two processes are linked together, both of which are based on the algorithm of FIG. 6: in (a) the amplitude of the perturbation interrogation pulse is incrementally increased until the drop ejection threshold is reached; and in (b) a z-sweep is performed, i.e., the process of iteratively translating in transducer height, or z position, in equal increments, and invoking the algorithm of FIG. 6 at each position. The entire process is set forth in steps 1-3 below.

1. Incrementally increase the amplitude of the perturbation interrogation pulse, and run the algorithm of FIG. 6 at each amplitude setting. Convert minima-spacing to energy below drop ejection threshold for each amplitude setting. As soon as the drop ejection threshold (i.e. the energy below drop ejection threshold is about 0 dB) is reached, perform a linear regression and set the amplitude of the perturbation interrogation pulse to the calculated drop ejection threshold.

2. Determine the optimal transducer z position at this amplitude setting, by performing a z-sweep and subsequently fitting a quadratic function to the resulting transducer z position versus a function based on the spacing between two minima, i.e., y=f (z). The minima of the quadratic function yield the z-position at which the minimum spacing between two minima at the power setting of (1) occurs. This transducer z-position is the optimal position at the power setting found in (1) to eject a droplet.

3. Perform (1) again, at the optimal z-position found in (2), to further refine the precise amplitude setting of the perturbation interrogation pulse.

Once both the optimal transducer z-position and power setting have been measured, by proceeding through steps 1-3, generate a small number of perturbation interrogation pulses, at the power setting found in (3) and z position found in (2), measuring the energy delivered to the transducer. This energy level (measured in the system of the present invention in mJ) is then used to calibrate the power system of the apparatus.

It should be evident, then, that the invention provides a number of previously unrealized advantages for assessing the fluid in a plurality of reservoirs. First, acoustic assessment is a generally noninvasive technique that may be carried out regardless of whether the reservoirs are sealed or open. That is, acoustic assessment does not require extracting a sample for analysis or other mechanical contact that may result in sample cross-contamination. In addition, unlike optical detection techniques, optically translucent or transparent reservoirs are not required. This, of course, provides a wider range of choices for material that may be employed for reservoir construction. In addition, the use of opaque material would be particularly advantageous in instances wherein the reservoirs are constructed to contain photosensitive fluids.

Thus, variations of the present invention will be apparent to those of ordinary skill in the art. For example, while FIG. 1 depicts the inventive apparatus in operation to form a biomolecular array bound to a substrate, the apparatus may be operated in a similar manner to format a plurality of fluids, e.g., to transfer fluids from odd-sized bulk containers to wells of a standardized well plate. Similarly, while FIG. 2 illustrates that the acoustic radiation generator and the detector are in vertical opposing relationship, other spatial and/or geometric arrangements may be employed so long as acoustic radiation generated is transmitted through at least a portion of the reservoir to the detector.

In addition, the invention may be constructed as to be highly compatible with existing infrastructure of materials discovery and with existing automation systems for materials handling. For example, the invention may be adapted for use as an alternative or a supplement to content assessment means that are based on optical detection. In some instances, sonic markers may be provided in the reservoirs to identify the fluid in the reservoir. Thus, the invention may be employed as a means for inventory identification and control in a number of contexts, including, but not limited, to biological, biochemical, and chemical discovery and analysis. Also, differences in the acoustic transmission behaviors of different reservoirs and their contents can be measured by the present invention and used to modify the drop forming pulse to improve consistency in energy levels and droplet volumes for droplet ejection.

It is to be understood that while the invention has been described in conjunction with the preferred specific embodiments thereof, the foregoing description is intended to illustrate and not limit the scope of the invention. Other aspects, advantages, and modifications will be apparent to those skilled in the art to which the invention pertains.

All patents, patent applications, journal articles, and other references cited herein are incorporated by reference in their entireties.

We claim:

1. An apparatus for acoustically ejecting a droplet of fluid from each of a plurality of reservoirs comprising:
   a plurality of fluid reservoirs contained in or located on a substrate;
   a quantity of fluid disposed in each reservoir of the plurality of fluid reservoirs;
   an acoustic radiation generator for generating at least one pulse of acoustic radiation;
   a means for successively acoustically coupling the acoustic radiation generator with each reservoir such that at least one pulse of acoustic radiation generated by the acoustic radiation generator is transmitted through the substrate and into the fluid to a site at or near the surface of the fluid in each reservoir in a manner effective to eject a droplet from each reservoir acoustically coupled to the acoustic radiation generator; and
   an analyzer for determining, prior to acoustically ejecting a droplet of fluid from a reservoir, the wave form of a droplet-forming pulse of acoustic radiation to be generated, wherein the analyzer is further configured to determine an amplitude for the droplet-forming pulse which is sufficient to eject a fluid droplet;
   wherein the analyzer is further configured to, for determining the amplitude for the droplet-forming pulse for a reservoir:
      (i) acoustically couple an acoustic ejector with the reservoir;
      (ii) activate the acoustic ejector to generate and direct a perturbation pulse into the reservoir such that the surface of the fluid is disturbed but no fluid droplet is ejected;
      (iii) generate a perturbation interrogation pulse directed at the surface of the fluid;
      (iv) detect a reflection of the perturbation interrogation pulse from the surface of the fluid; and
      (v) process the reflection detected in step (iv);
   wherein the processing of step (v) includes analyzing the frequency spectrum of a portion of the reflection detected in step (iv);
   wherein the processing of step (v) includes using a frequency domain-based algorithm to identify the difference in frequency between two minima of the frequency spectrum of the reflection detected in step (iv).

2. The apparatus of claim 1, wherein an echo portion of the reflection detected in step (iv) is identified.

3. The apparatus of claim 2, wherein the echo portion is less than 1% of the reflection detected in step (iv).

4. The apparatus of claim 1, wherein the frequency domain-based algorithm is a Fast Fourier Transform-based algorithm.

5. The apparatus of claim 1, wherein the perturbation pulse and the droplet-forming pulse have a similar frequency spectrum.

6. The apparatus of claim 1, wherein the perturbation pulse and the droplet-forming pulse are centered at frequencies within 100 MHz of each other.

7. The apparatus of claim 3, wherein frequencies at which the perturbation pulse and the droplet-forming pulse are centered lie between 1 MHz and 200 MHz.

8. The apparatus of claim 1, wherein the time elapsed between the perturbation interrogation pulse and the droplet-forming pulse is no more than 1 millisecond.

9. The apparatus of claim 1, wherein the time elapsed between the perturbation interrogation pulse and the droplet-forming pulse is no more than one second.

10. The apparatus of claim 1, wherein the time elapsed between the perturbation interrogation pulse and the droplet-forming pulse is no more than 1 hour.

11. The apparatus of claim 1, wherein the time elapsed between the perturbation pulse and the perturbation interrogation pulse is no more than 10 milliseconds.

12. The apparatus of claim 1, wherein the duration of the perturbation pulse is between 0.5 μseconds and 1000 μseconds.

13. The apparatus of claim 6, wherein the acoustic energy of the perturbation interrogation pulse is between 80% and 120% of the acoustic energy of the droplet-forming pulse.

14. The apparatus of claim 6, wherein the duration of the droplet-forming pulse is between 0.5 μseconds and 1000 μseconds.

15. The apparatus of claim 1, wherein the perturbation pulse is at least 0.5 dB lower in power that the droplet-forming pulse.

16. The apparatus of claim 1, wherein the acoustic radiation generator is a single acoustic radiation generator.

17. The apparatus of claim 1, wherein the fluid reservoirs and the quantities of fluid within the fluid reservoirs are removable from the remainder of the apparatus.

18. The apparatus of claim 1, wherein the fluid reservoirs are individual wells in one or more well plates.

19. The apparatus of claim 1, wherein the fluid reservoirs are substantially acoustically indistinguishable.

20. The apparatus of claim 1, wherein the fluid reservoirs are optically opaque.

21. The apparatus of claim 1, wherein the fluid reservoirs are sealed.

22. The apparatus of claim 1, wherein the apparatus comprises 96 reservoirs.

23. The apparatus of claim 22, wherein the apparatus comprises 384 reservoirs.

24. The apparatus of claim 23, wherein the apparatus comprises 1536 reservoirs.

25. The apparatus of claim 24, wherein the apparatus comprises 3456 reservoirs.

26. The apparatus of claim 25, wherein the apparatus comprises 10,000 reservoirs.

27. The apparatus of claim 26, wherein the apparatus comprises 100,000 reservoirs.

28. The apparatus of claim 27, wherein the apparatus comprises more than 500,000 reservoirs.

29. The apparatus of claim 1, wherein at least one reservoir is constructed to contain no more than about 1 mL of fluid.

30. The apparatus of claim 1, wherein at least one reservoir is constructed to contain no more than about 1 ÅL of fluid.

31. The apparatus of claim 30, wherein at least one reservoir is constructed to contain no more than about 1 nL of fluid.

32. The apparatus of claim 1, wherein the fluid in the fluid reservoirs is an aqueous fluid.

33. The apparatus of claim 1, wherein the fluid in the fluid reservoirs is a non-aqueous fluid.

34. The apparatus of claim 33, wherein the nonaqueous fluid comprises an organic solvent.

35. The apparatus of claim 1, wherein the fluid contains a biomolecule.

36. The apparatus of claim 1, wherein the fluid is at least partially frozen.

37. The apparatus of claim 1, wherein at least one reservoir contains a substance capable of existing as a fluid at a temperature of about 0° C. to about 100° C.

38. The apparatus of claim 1, further comprising a means for altering the relative position of the analyzer with respect to the fluid reservoirs.

39. The apparatus of claim 1, wherein the analyzer is positioned in fixed alignment with respect to the acoustic radiation generator.

40. The apparatus of claim 1, wherein the acoustic radiation generator comprises a component common to the analyzer.

41. The apparatus of claim 40, wherein the component common to the acoustic radiation generator and the analyzer is a piezoelectric element.

42. The apparatus of claim 1, wherein the analyzer is adapted to analyze a characteristic of acoustic radiation to determine a property of the fluid in each reservoir.

43. The apparatus of claim 42, wherein the property is acoustic impedance.

44. The apparatus of claim 42, wherein the property is acoustic attenuation.

45. The apparatus of claim 42, wherein the characteristic is the intensity of the acoustic radiation.

46. The apparatus of claim 42, wherein the characteristic is the wavelength of the acoustic radiation.

47. The apparatus of claim 40, further comprising a focusing means for focusing acoustic radiation generated by the acoustic radiation generator.

48. The apparatus of claim 47, wherein the focusing means is adapted to focus the acoustic radiation according to results of an analysis performed by the analyzer.

49. The apparatus of claim 1, further comprising a temperature control means for controlling the temperature of the fluid reservoirs.

* * * * *